(12) United States Patent
Sasaki

(10) Patent No.: US 9,607,519 B2
(45) Date of Patent: Mar. 28, 2017

(54) VEHICLE DRIVING CONTROL SYSTEM

(71) Applicant: NISSAN MOTOR CO., LTD., Kanagawa (JP)

(72) Inventor: Makiko Sasaki, Atsugi (JP)

(73) Assignee: Nissan Motor Co., Ltd., Yokohama-Shi, Kanagawa (JP)

(*) Notice: Subject to any disclaimer, the term of this patent is extended or adjusted under 35 U.S.C. 154(b) by 374 days.

(21) Appl. No.: 14/373,509

(22) PCT Filed: Feb. 1, 2013

(86) PCT No.: PCT/JP2013/052381
§ 371 (c)(1),
(2) Date: Jul. 21, 2014

(87) PCT Pub. No.: WO2013/136870
PCT Pub. Date: Sep. 19, 2013

(65) Prior Publication Data
US 2014/0365104 A1 Dec. 11, 2014

(30) Foreign Application Priority Data
Mar. 12, 2012 (JP) .................. 2012-054707

(51) Int. Cl.
*G08G 1/056* (2006.01)
*G08G 1/052* (2006.01)
(Continued)

(52) U.S. Cl.
CPC ....... *G08G 1/163* (2013.01); *B60W 30/18154* (2013.01); *B60W 30/18163* (2013.01);
(Continued)

(58) Field of Classification Search
CPC .......... G08G 1/16; G08G 1/161; G08G 1/162; G08G 1/163; G08G 1/165; G08G 1/166;
(Continued)

(56) References Cited

U.S. PATENT DOCUMENTS 6,292,725 B1* 9/2001 Kageyama ............. G05D 1/027
180/169
6,360,171 B1 3/2002 Miyamoto et al.
(Continued)

FOREIGN PATENT DOCUMENTS

JP 11-110693 A 4/1999
JP 2002-140799 A 5/2002
(Continued)

*Primary Examiner* — Thomas G Black
*Assistant Examiner* — Sara Lewandroski
(74) *Attorney, Agent, or Firm* — Young Basile Hanlon & MacFarlane, P.C.

(57) ABSTRACT

A driving control system has a position/speed information detecting section for detecting the position and speed of a host vehicle, a communication unit for acquiring the position and speed information of another vehicle, a proximity position estimating section that estimates a proximity position at which the host vehicle and the other vehicle approach each other and a proximity position changing unit that, when the host vehicle and the other vehicle are travelling on the same lane at the same time, changes the proximity position to a changed proximity position outside of a waiting time generation area. A travelling plan generation section generates a travelling plan while the other one of the host-vehicle and the other vehicle enters the waiting time generation area. A communication unit transmits the travelling plan to the other vehicle, and a travel driving unit executes the driving of the host vehicle according to the travelling plan.

5 Claims, 24 Drawing Sheets

(51) Int. Cl.
*G08G 1/16* (2006.01)
*B60W 30/18* (2012.01)

(52) U.S. Cl.
CPC ... *B60W 2520/10* (2013.01); *B60W 2550/402* (2013.01); *G08G 1/16* (2013.01); *G08G 1/165* (2013.01); *G08G 1/166* (2013.01); *G08G 1/167* (2013.01)

(58) Field of Classification Search
CPC .......... G08G 1/167; G08G 1/20; G08G 1/207; B60W 30/18154; B60W 30/18163; B60W 30/18145
See application file for complete search history.

(56) References Cited

U.S. PATENT DOCUMENTS

| | | | | |
|---|---|---|---|---|
| 6,437,688 | B1* | 8/2002 | Kobayashi | G08G 1/166 180/167 |
| 6,459,991 | B1 | 10/2002 | Takiguchi et al. | |
| 7,382,274 | B1* | 6/2008 | Kermani | B60K 31/0058 340/435 |
| 2007/0035416 | A1* | 2/2007 | Tanaka | B60T 7/18 340/906 |
| 2007/0135989 | A1* | 6/2007 | Hengst | B60W 40/04 701/117 |
| 2007/0262880 | A1* | 11/2007 | Curtis | G08G 1/162 340/901 |
| 2011/0227713 | A1* | 9/2011 | Amann | B60W 30/0953 340/435 |
| 2011/0291874 | A1* | 12/2011 | De Mersseman | B60R 21/0134 342/70 |
| 2012/0004835 | A1* | 1/2012 | Sato | G08G 1/0104 701/118 |
| 2012/0123660 | A1* | 5/2012 | Kagawa | B60W 30/16 701/96 |
| 2012/0130629 | A1* | 5/2012 | Kim | B60W 30/085 701/301 |
| 2012/0235853 | A1* | 9/2012 | Takeuchi | B60W 30/09 342/71 |
| 2012/0271539 | A1* | 10/2012 | Bald | B60W 50/0097 701/300 |
| 2013/0030686 | A1* | 1/2013 | Morotomi | G08G 1/167 701/301 |
| 2013/0085976 | A1* | 4/2013 | Bone | B60W 30/18163 706/46 |
| 2013/0179025 | A1* | 7/2013 | Deng | B60W 30/165 701/23 |
| 2013/0179047 | A1* | 7/2013 | Miller | B60W 30/09 701/70 |

FOREIGN PATENT DOCUMENTS

| | | |
|---|---|---|
| JP | 2002-269699 A | 9/2002 |
| JP | 2007-207047 A | 8/2007 |
| JP | 2011-113275 A | 6/2011 |

* cited by examiner

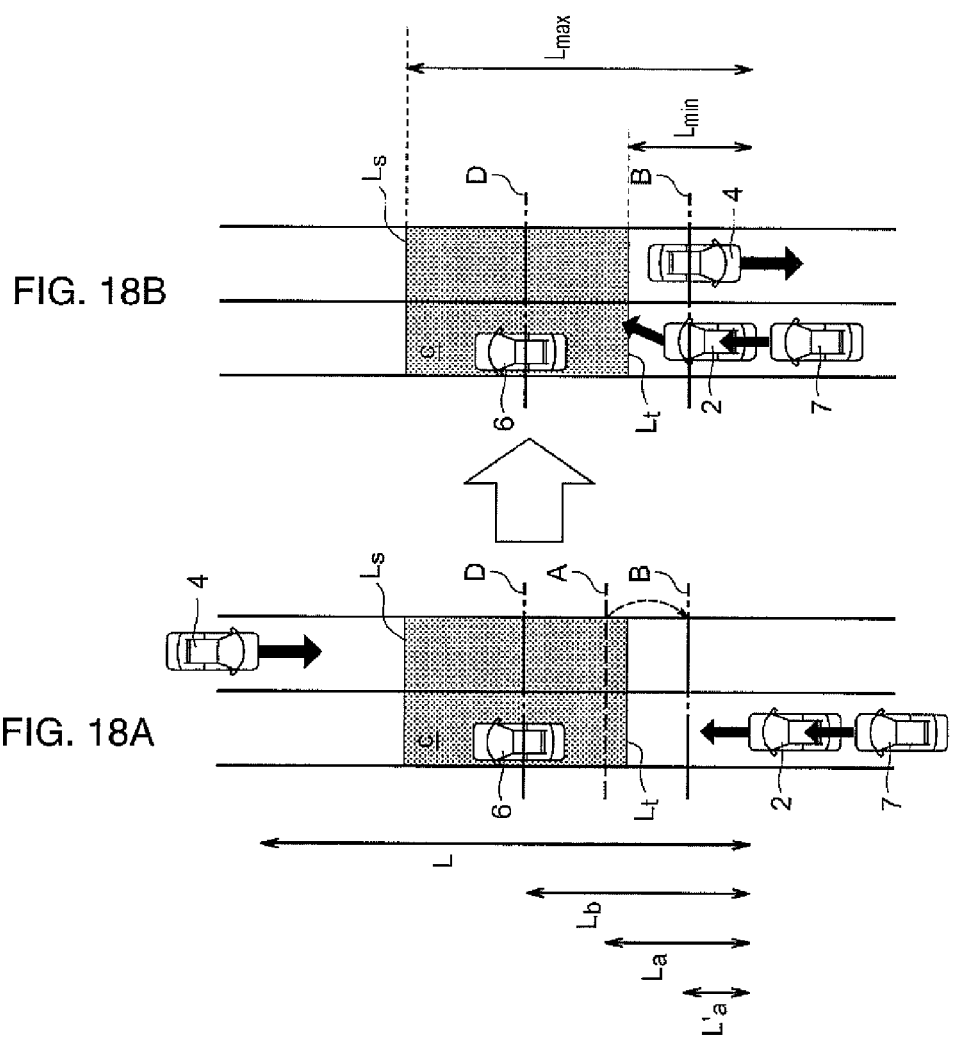

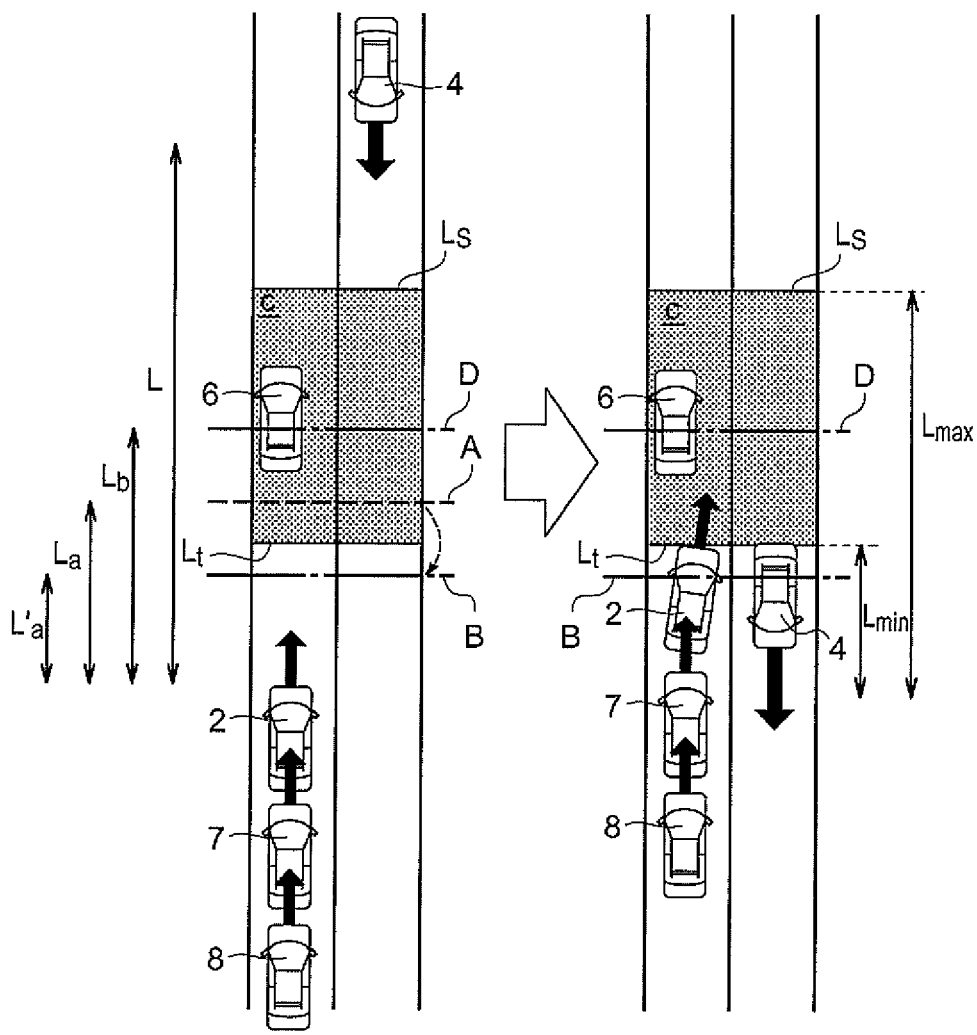

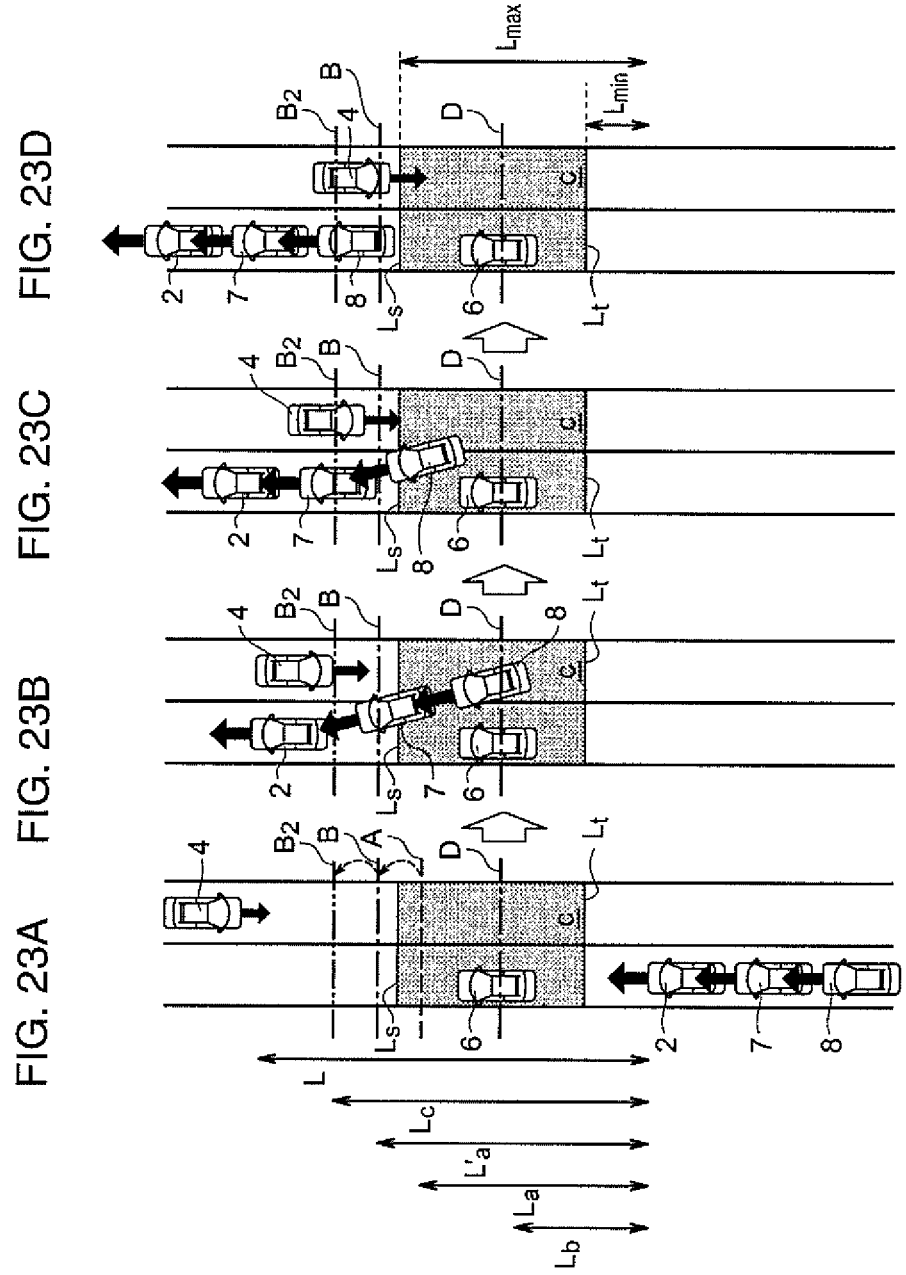

VEHICLE DRIVING CONTROL SYSTEM

CROSS REFERENCE TO RELATED APPLICATION

The present application claims priority to Japanese Patent Application No. 2012-054707, filed Mar. 12, 2012, incorporated herein in its entirety.

TECHNICAL FIELD

The present invention relates to a driving control system for controlling the running or driving of the vehicle.

BACKGROUND

Conventionally, a traffic control system is known in which, at an intersection, a straight-through vehicle and a right-turn vehicle perform a bi-directional communication and the right-turn vehicle is allowed to turn right with the permission of the straight-through vehicle (for example, see Japanese Patent Application Publication No. H11-110693 A).

However, in the traffic control system described above, the right-turn vehicle is not allowed to turn right without the permission of the straight-through vehicle. Thus, even in a state in which the right-turn vehicle can turn right successfully or adequately, a waiting time or latency time is generated to the right-turn vehicle.

BRIEF SUMMARY

The object of the present invention is to provide a driving control system capable of reducing the waiting time of the vehicle when the vehicles pass each other or intersect each other.

The present invention solves the above-described problem, when a host-vehicle and the other vehicle are traveling on the same lane at the same time in a predetermined area in which a proximity position at which the host-vehicle and the other vehicle come close or approach each other is located, by causing a driving control system to change the proximity position outside of the predetermined area, a driving control is performed in such a way that both the host-vehicle and the other vehicle are approaching the changed proximity position and, after one of the host-vehicle and the other vehicle has passed the predetermined area, the other one of the host-vehicle and the other vehicle is configured to enter the predetermined area.

According to the present invention, there is no possibility that, when the vehicles intersect with each other or pass each other, it is possible to reduce the waiting time of the vehicle since the vehicle is not required to stop.

BRIEF DESCRIPTION OF THE DRAWINGS

FIGS. 18A and 18B are top views explaining the third travelling plan in the third exemplary embodiment according to the present invention;

FIGS. 21A and 21B are top views explaining a fifth travelling plan in the third exemplary embodiment according to the present invention;

FIGS. 23A-23D are top views explaining the sixth travelling plan in the third exemplary embodiment according to the present invention.

DETAILED DESCRIPTION OF THE EMBODIMENTS

Figure 1:
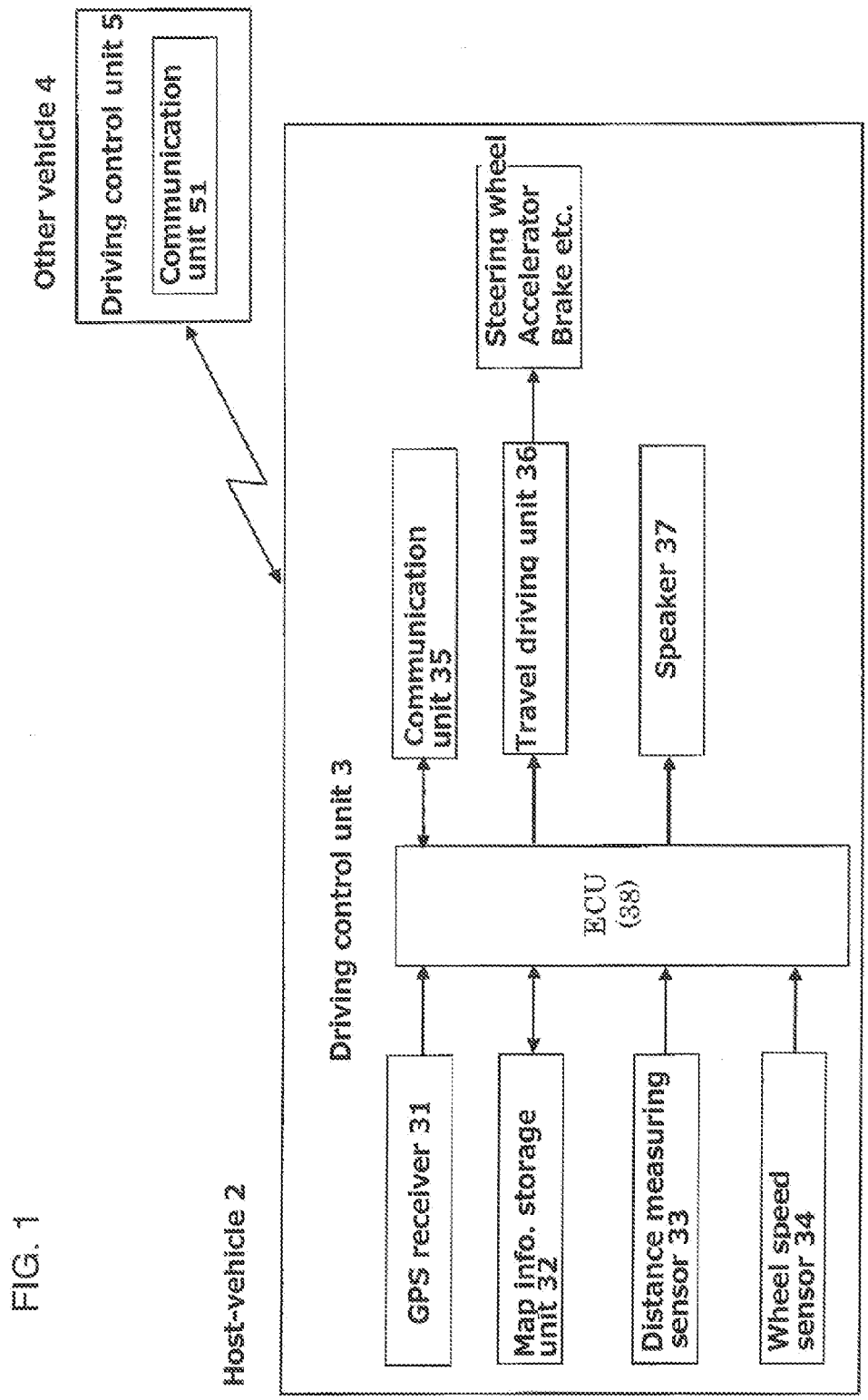
FIG. 1 is a block diagram showing the structure of the driving control system in a first exemplary embodiment according to the present invention.
Figure 2:
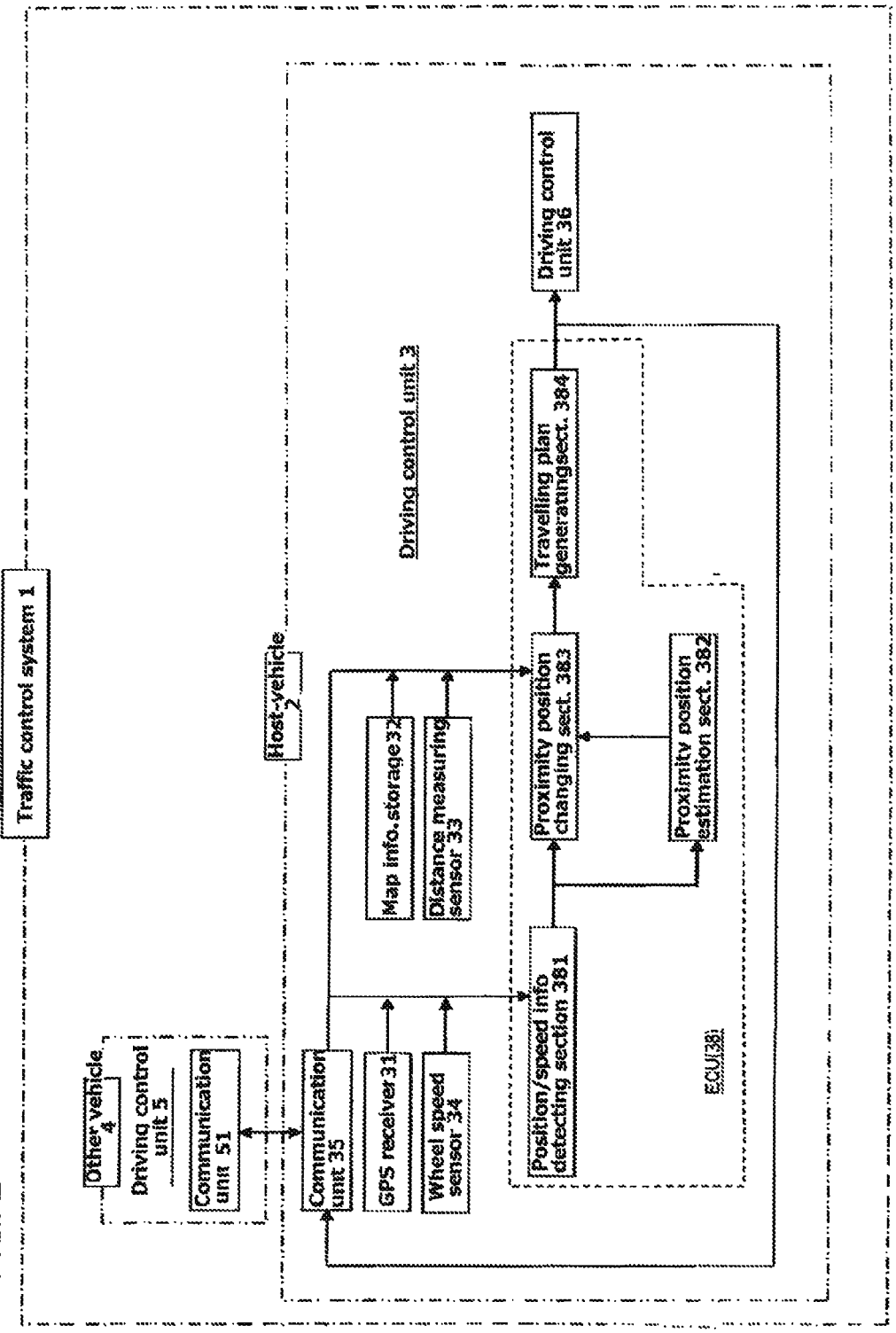
FIG. 2 is a functional block diagram illustrating the functions of the driving control system in the first exemplary embodiment according to the present invention.

Below, a description will be given of exemplary embodiments according to the present invention with reference to the drawings. FIG. 1 is a block diagram showing the structure of the driving control system in the present exemplary embodiment and FIG. 2 is a functional block diagram illustrating the function of the driving control system according to the present embodiment, respectively.

A traffic control system is intended for implementing the traffic control of a vehicle, as shown in FIG. 1, and a driving control unit 3 installed on a host-vehicle 2, a driving control unit 5 installed on the other vehicle 4 are provided.

As shown in the figures, the driving control unit 3 installed on the host-vehicle has a GPS (Global positioning system) receiver 31, a map information storage device 32, a distance measuring sensor 33, a wheel speed sensor 34, a communication unit 35, and a travel driving unit 36, a speaker 37, and an ECU (Electronic Control Unit) 38.

The GPS receiver 31 is a device that receives location information (signal) of the vehicle 2 from the GPS satellites, and outputs to the ECU 38 the position information.

The map information storage unit 32 is a device for storing map information such as link data and node data. That is, the map information storage unit 32 stores road information such as lanes, curves, intersections and the like.

The distance measuring sensor 33 is a device that detects the presence or absence of an obstacle present in the traveling direction of the vehicle 2, and detects the distance to the obstacle from the vehicle 2. The distance measuring sensor 33 outputs to the ECU 38 the information of the distance to the obstacle from the vehicle 2 as well as the information regarding the presence or absence of the detected obstacle. As the distance measuring sensor 33, for example, an ultrasonic sensor and laser radar may be listed.

The wheel speed sensor 34 is a device for detecting the rotational speed of the wheels of the vehicle 2. The wheel speed sensor 34 also outputs to the ECU 38 information of the detected rotational speed of the wheel.

The communication unit 35 is a device that performs wireless communication with other vehicle 4 that is driven toward the host-vehicle 2. From the communication unit 51 of the other vehicle 4, this communication unit 35 receives a signal indicative of position and speed of the other vehicle 4 to output to the ECU 38. Further, the communication unit 35 transmits a signal about a travelling plan (described below) to the communication unit 51 of the other vehicle in response to a command from the ECU 38.

Based on the travelling plan ECU 38 has created the travel driving unit 36 controls a steering angle of the steering wheel, an accelerator opening degree, a depression amount of the brake, and the like.

The speaker 37 outputs a voice for guiding a driving operation. Further, on the basis of a signal from the vehicle 4 acquired by the communication unit 35, the speaker may be configured to generate the audio signal alerting to the presence of the other vehicle 4 or to generate the audio signal informing of an obstacle based on the obstacle information detected by the distance measuring sensor 33.

The ECU 38 is a computer that functions to execute a driving assistance of the host-vehicle 2 based on the various signals acquired from the distance measuring sensor 33, the wheel speed sensor 34 and the communication unit 35 etc., and is provided, as shown in FIG. 2, a position/speed information detection section 38, a proximity position estimation section 382, a proximity position changing section 383, and a travelling plan generating section 384.

As shown in the figure, on the basis of position information (signal) of the host-vehicle 2 obtained from the GPS receiver 31, it is possible for the position/speed information detecting section 381 to detect the position of the vehicle 2 and to detect the speed of the host-vehicle 2 based on the wheel rotational speed acquired from the wheel speed sensor 34.

Further, the position/speed information detecting section 381 detects the position and the speed of the other vehicle 4 based on the position information and the speed information of the other vehicle 4 transmitted by the communication unit 51 of the other vehicle 4 and received by the communication unit 35 of the host-vehicle 2.

The proximity position estimation section 382 estimates a proximity or approaching position A (see FIG. 4) at which the travelling host-vehicle 2 and the other vehicle oncoming or travelling towards the host-vehicle approach each other, based on the position and speed of the host-vehicle 2 as well as the position and speed of the other vehicle 4.

The proximity position changing unit 383 determines, based on the map information stored in the map information storage unit 32, the driving scene of the host-vehicle is located in any of the scenes including an obstacle avoidance scene, in a single path, an intersection scene and a merging scene.

Further, the proximity position changing unit 383 changes the proximity position A to a changed proximity position B (see FIG. 4) according to the position of the obstacle detected by the distance measuring sensor 33, the position and speed of the host-vehicle 2 detected by the position/speed information detecting section 381 and the position and speed of the other vehicle 4. Note that the changed proximity position B refers to such a position in which the host-vehicle 2 and the other vehicle 4 may pass each other while travelling (i.e., both without stopping).

The travelling plan generating section 384 generates a travelling plan for the host-vehicle and the other vehicle 4 such that the host-vehicle 2 and the other vehicle 4 come closer to each other at the changed proximity position B described above and outputs a command of the travelling plan to the travel driving unit 36 to further transmit to the other vehicle 4 via the communication unit 35.

The travelling plan in this case refers to a plan according to which the host-vehicle 2 is planned to be accelerated or decelerated until the host-vehicle 2 has reached the changed proximity position B and the other vehicle 4 is planned to be accelerated or decelerated until the other vehicle has reached the changed proximity position B.

In the present embodiment, as described above, the position/speed information detecting unit 381, the proximity position estimation section 382, a proximity position changing section 383, and a travelling plan generating section 384 are constituted by an ECU 38. However, the specific configurations are not limited. For example, the position/speed information detecting section 381, the proximity position estimation section 382, the proximity position changing section 383, and the section 384 may be constituted by another computer which is different from the ECU 38.

The driving control unit 5 installed on the other vehicle has the same configuration as the driving control unit 3 of the host-vehicle 2, and has a GPS receiver for receiving position information of the vehicle from the GPS satellites, a map information storing unit for storing map information, a distance measuring sensor for detecting the distance to the obstacle, a wheel speed sensor for detecting the rotational speed of the wheel, and a communication unit 51 for performing a wireless communication with a communication unit 35 of the host-vehicle 2, and a traveling driving device to control a steering wheel, an accelerator, brake, etc. according to the travelling plan, a speaker, and a ECU to perform driving support or assistance. Note that a particular description is omitted except for the communication unit 51.

The communication unit 51 of the other vehicle 4 transmits to the host-vehicle that travels toward the other vehicle 4 a signal indicative of the presence of the other vehicle 4 as well as the position and speed information of the other vehicle 4 while receiving a travelling plan from the host-vehicle 2.

Figure 3:
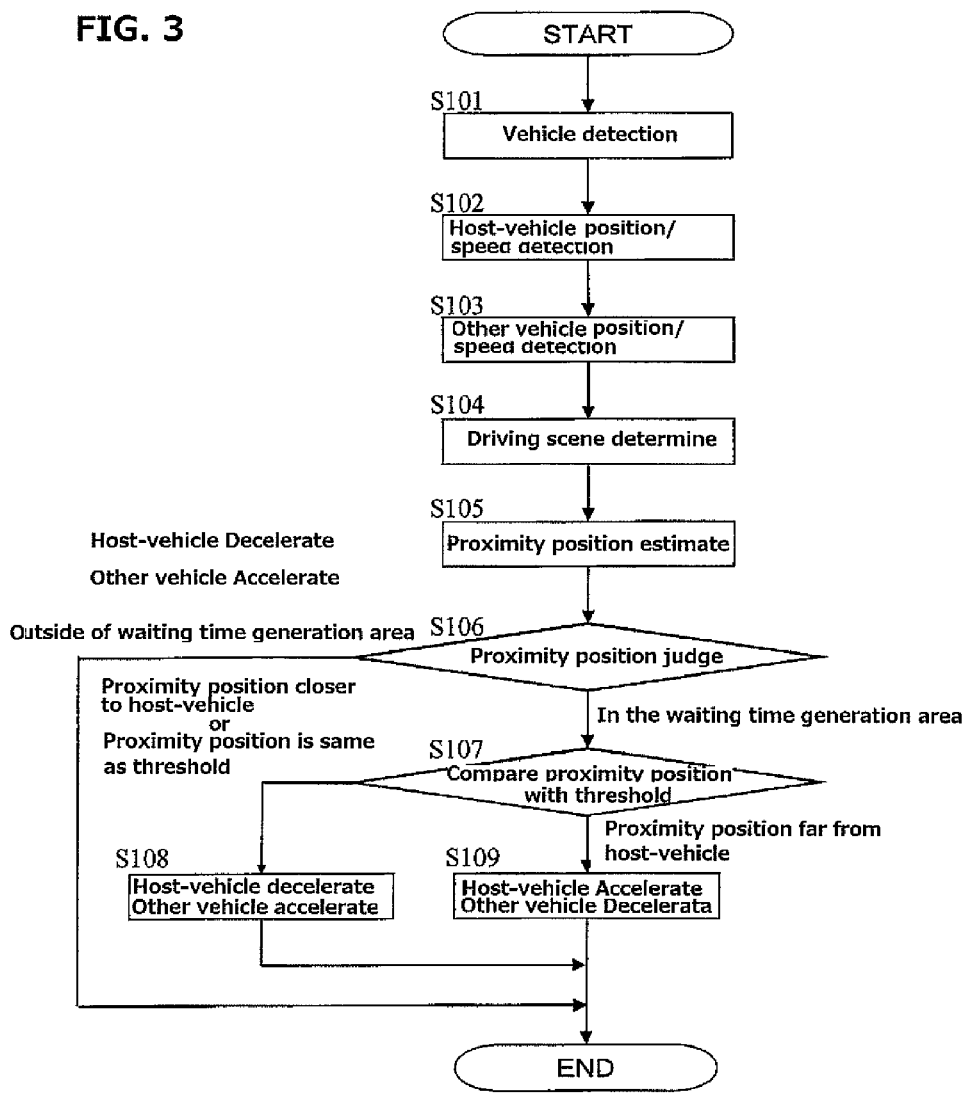
FIG. 3 is a flowchart illustrating a procedure of driving control of the driving control system in the first exemplary embodiment according to the present invention.

Now, a description is given of the control procedure of the driving control system in the present embodiment with reference to FIG. 3.

Figure 4:
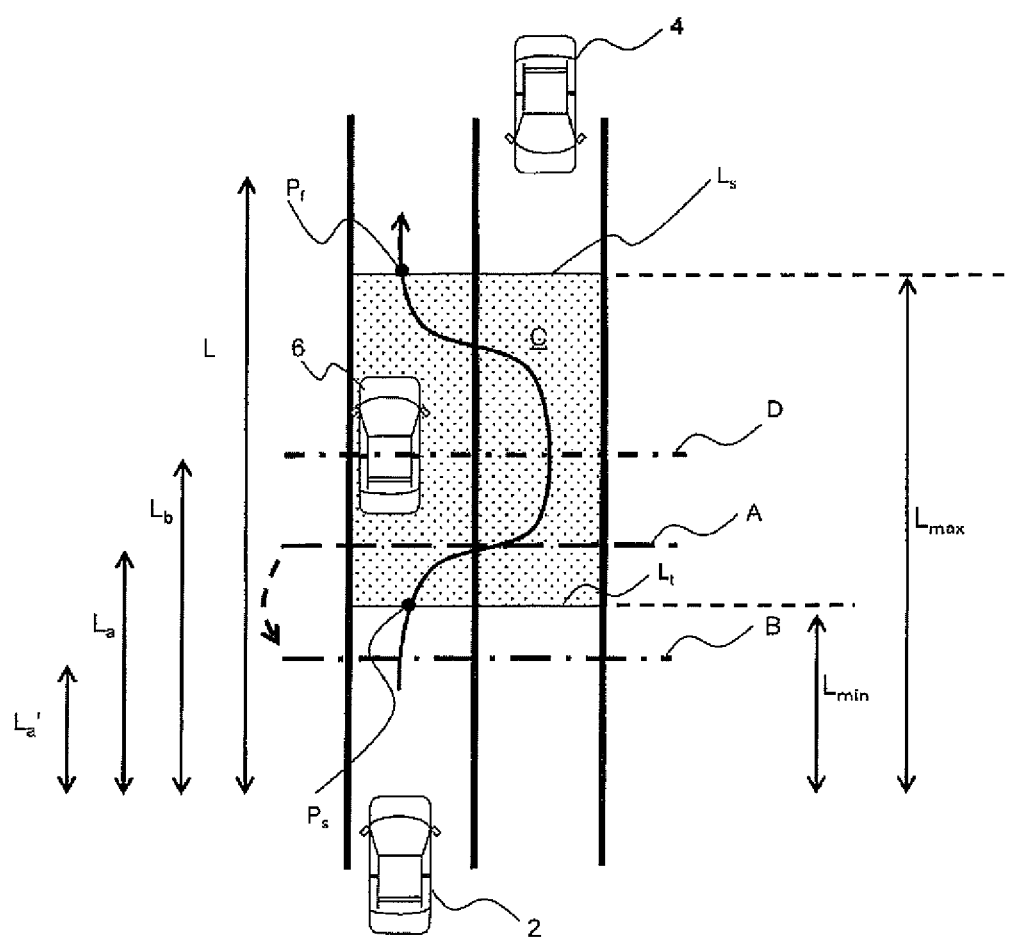
FIG. 4 is a diagram for explaining a driving control in an obstacle avoidance scene in a single path in the first embodiment according to the present invention (part 1)
Figure 5:
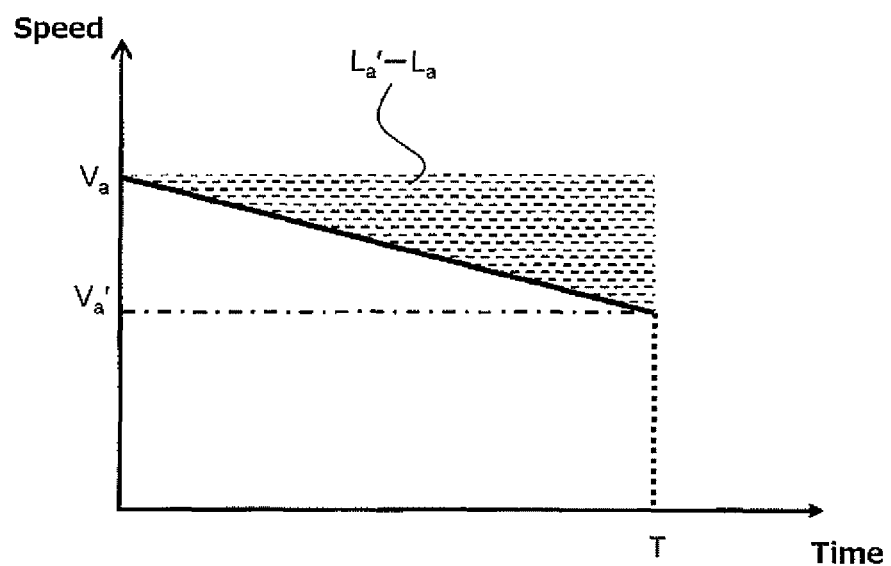
FIG. 5 is a graph illustrating a travelling plan of a host-vehicle in the first exemplary embodiment according to the present invention (part 1)
Figure 6:
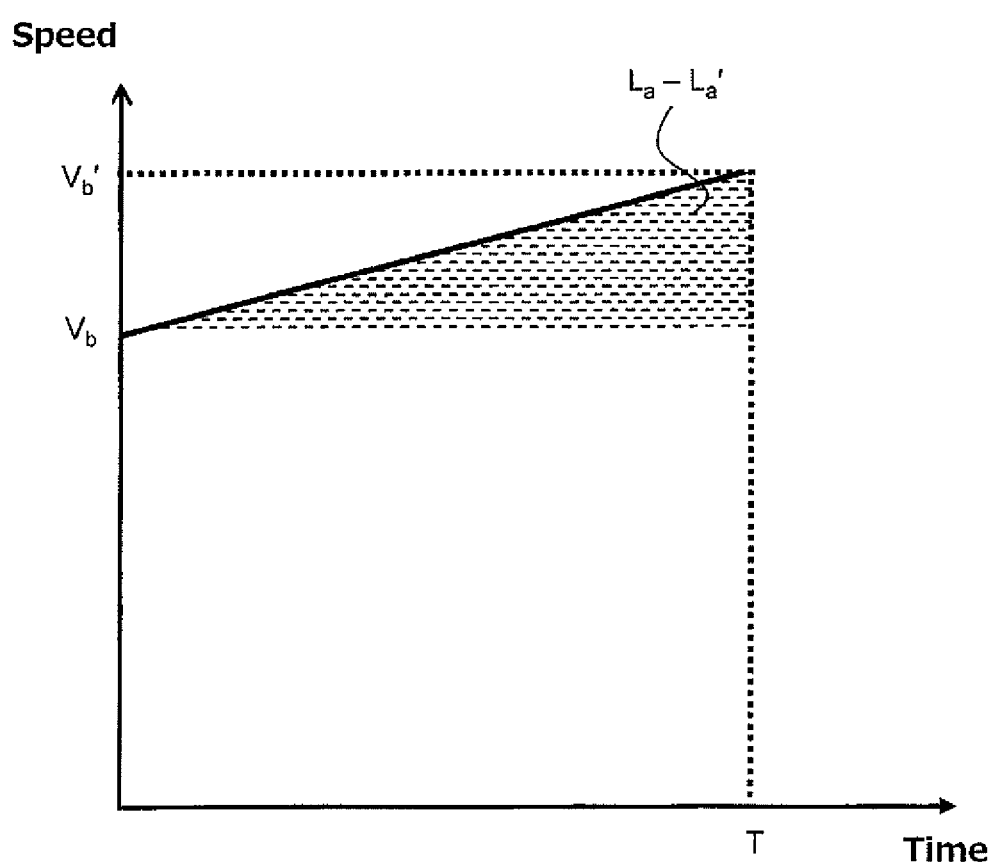
FIG. 6 is a graph illustrating a travelling plan of the other vehicle in the first exemplary embodiment according to the present invention (part 1)
Figure 7:
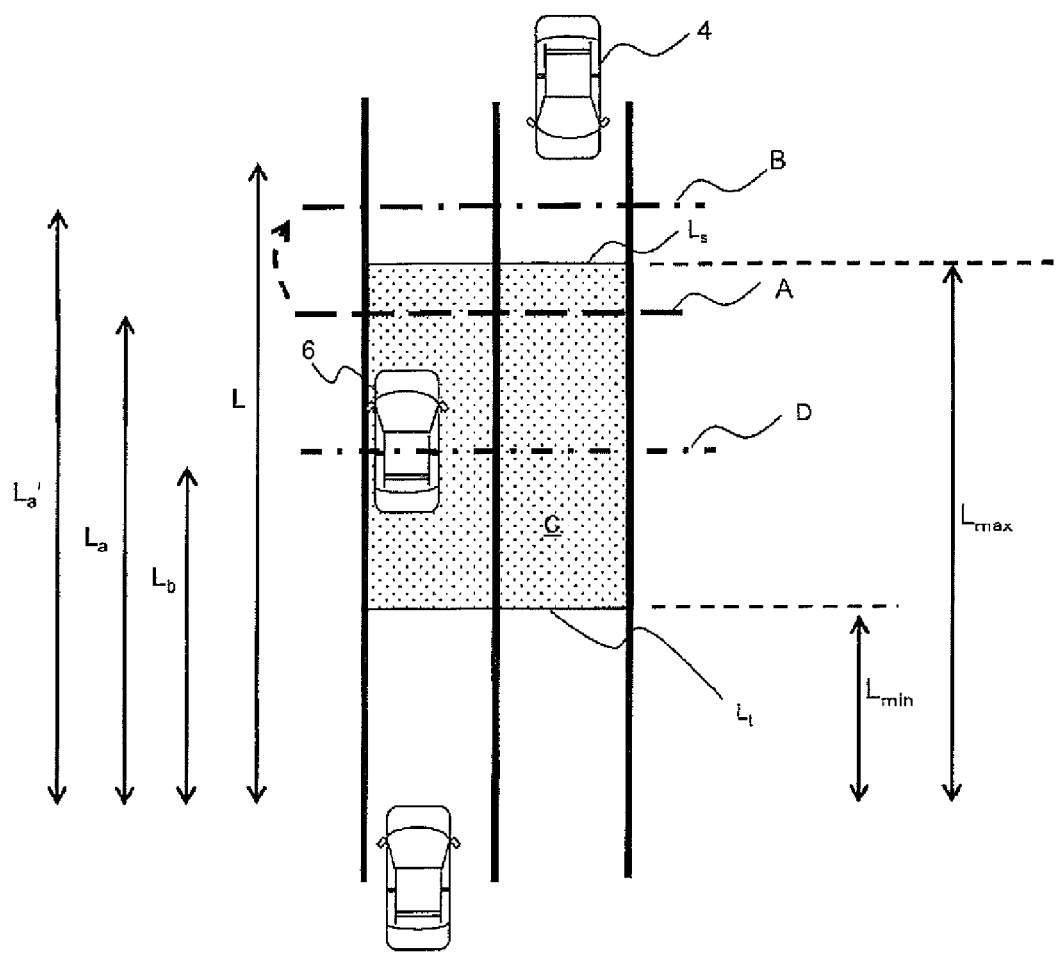
FIG. 7 is diagram for explaining a driving control of the obstacle avoidance scene in a single path in the first exemplary embodiment according to the present invention (part 2)
Figure 8:
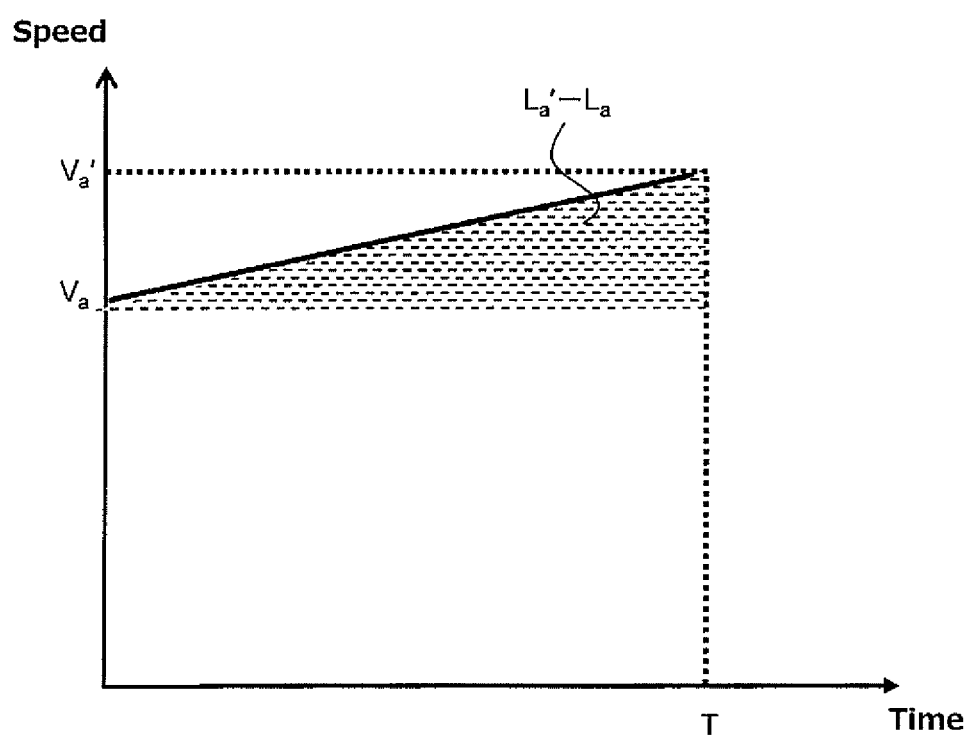
FIG. 8 is a graph illustrating the travelling plan of the host-vehicle in the first exemplary embodiment according to the present invention (part 2)
Figure 9:
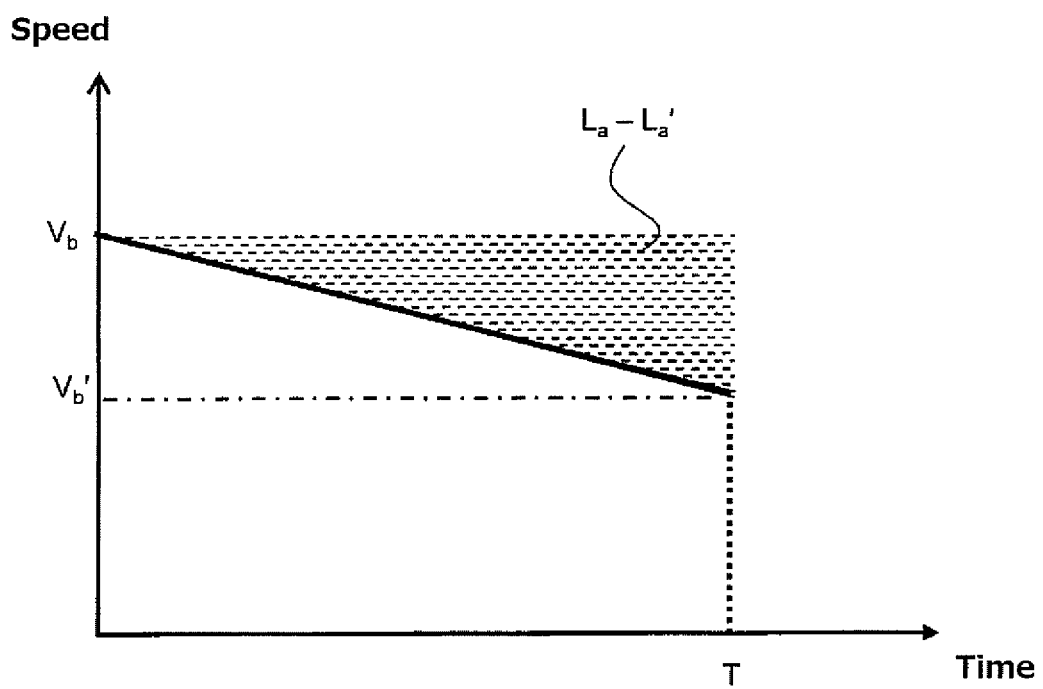
FIG. 9 is a graph illustrating the travelling plan of the other vehicle in the first exemplary embodiment according to the present invention (part 2)

In the present exemplary embodiment, FIG. 3 is a flowchart showing a procedure of driving control of the driving control system according to the present exemplary embodiment, FIGS. 4 and 7 are the diagrams explaining a driving control in an obstacle avoidance scene in a single path, FIGS. 5 and 8 are graphs explaining the travelling plan of the host-vehicle in the present embodiment, and FIGS. 6 and 9 are graphs explaining the travelling plan of the other vehicle in the present embodiment.

In the flowchart of FIG. 3, in step S101, the ECU 38 detects the presence of the other vehicle 4 by first receiving a signal transmitted from the other vehicle 4 by the communication unit 35 to output to the ECU 38 the received signal. Note that the detecting method of the other vehicle 4 is not limited in particular and the other vehicle 4 may be detected by a distance measuring sensor 33, for example.

Subsequently, in step S102, the ECU 38 (position/speed information detecting section 381) detects the position of the host-vehicle based on the signal acquired from the GPS receiver 31, and detects the speed of the host-vehicle 2 based on the rotation speed of the wheel detected by the wheel speed sensor 34.

Then, in step S103, the ECU 38 (position and speed information detecting section 381) detects the position of the other vehicle based on the position information of the other vehicle 4 transmitted by the communication units 51 of the other vehicle 4 and received by the communication unit 35 of the host-vehicle 2. Further, the ECU 38 detects the speed of the other vehicle 4 based on speed information of the other vehicle 4 transmitted by the communication unit 51 of the other vehicle 4 and received by the communication unit 35 of the host-vehicle 2.

Note that the method for detecting the position and speed of the other vehicle 4 is not limited to the above method. For example, the detection unit of the other vehicle may be provided in the host-vehicle 2, and the position and speed of the other vehicle 4 may be detected by the detection unit of the other vehicle. Such a detection unit, a laser range finder may be listed which is capable of measuring the speed of the other vehicle 4.

Then, in step S104, the ECU 38 (proximity position changing section 383) determines, based on the map information stored in the map information storage unit 32, in which scene the driving scene of the host-vehicle is found. The possible scenes may include an obstacle avoidance scene, an intersection scene, and a merging scene.

More specifically, first, based on the map information, a determination is made as to whether the scene corresponds to either an intersection scene or merging scene. When the scene does not correspond to any, ECU 38 causes the distance measuring sensor 33 of the host-vehicle 2 to detect an obstacle 6 (see FIG. 4) to thereby determine whether the scene corresponds to an obstacle avoidance scene in a single path.

Here, as shown in FIG. 4, the steps S105 to S109 will be described assuming that an obstacle 6 is detected by the distance measuring sensor 33, and the travel or driving scene of the host-vehicle 2 has been determined to correspond to the obstacle avoidance scene in a single path.

In step S105, the ECU 38 (proximity position estimation section 382) estimates the proximity position A at which the host-vehicle 2 and the other vehicle 4 come closer to each other, as shown in FIG. 4, based on the position and speed of the host-vehicle 3 detected in step S102 and the position and speed of the other vehicle 4 detected in step S103.

Specifically, on the basis of Equations (1) and (2), the distance L, from the host-vehicle 2 to the proximity position A are calculated.

$$T=L/(Va+Vb) \quad (1)$$

$$La=Va \times T \quad (2)$$

wherein, in the above Equations (1) and (2), T denotes a time period with which the host-vehicle 2 and the other vehicle 4 would reach the proximity position A when continuing the driving or running state before the driving control, L denotes a distance between the host-vehicle 2 and the other vehicle 4, Va denotes a speed of the host-vehicle 2, and the Vb denotes a speed of the other vehicle.

Then, in step S106, ECU 38 judges whether or not the proximity position A estimated in step S105 is located within a wanting time or latency generation area C (see FIG. 4).

Here, the waiting time generation area C of the obstacle avoidance scene in a single path refers, as shown in FIG. 4, to an area in which, because of the presence of the obstacle 6 in the traveling or driving lane of the host-vehicle 2, the host-vehicle 2 enters the opposite lane to avoid the obstacle so that a situation occurs in which the host-vehicle 2 and the other vehicle 4 drive or travel on the same lane on the same time. That is, in the waiting time generation area C, since it is not possible for the host-vehicle 2 and the other vehicle 4 travelling towards the host-vehicle 2 to pass each other with a sufficient margin, the host-vehicle 2 should stop and has to wait for the other vehicle to pass.

This waiting time generation area C is set as follows by the ECU 38. Specifically, with respect to the waiting time generation area C, in order for the vehicle 2 to avoid an obstacle 6, the ECU 38 sets a starting point P as a position at which the host-vehicle steps into the opposite or oncoming lane. The ECU 38 further sets an endpoint $P_f$ which is set by adding a travel path required for the host-vehicle 2 to return to the original travel lane. In addition, the ECU 38 sets the width of the waiting time generation area C by adding the width of the opposite late to the width of the travel lane of the host-vehicle 2.

Note that in the present exemplary embodiment, as shown in FIG. 4, the distance between one end Lt of the waiting time generation area C (above described starting point Ps) and the host-vehicle 2 is set to $L_{min}$. Note further that the distance between the other end Ls of the waiting time generation area C (above described endpoint Pf) and the host-vehicle is set to $L_{max}$.

In step S106, for example, based on whether or not to satisfy the following formula (3), it is determined whether or not the proximity position A is located within the waiting time generation area C.

$$L_{min} < La < L\max \quad (3)$$

If it is determined in step S106, the proximity position A is not located within the waiting time generation area C (the equation (3) not being satisfied.), the driving control of the travel control unit 3 is terminated.

On the other hand, if it is determined in step S106 that the proximity position A is located in the waiting time generation area C (thus, satisfying the Equation (3)), it is considered that the host-vehicle 2 and the other vehicle 4 travel the same lane at the same time, the process proceeds to step S107.

In step S107, the ECU 38 (proximity position changing unit 383) sets a position threshold D in the waiting time generation area C. As shown in FIG. 4, the position threshold D in the obstacle avoidance scene in a single path is set at the center of the obstacle 6. In the following, the distance between the position threshold D and the host-vehicle 2 is shown by $L_b$.

Then, by comparing the distance La between the proximity position A and the host-vehicle 2 with the distance Lb between the set position threshold D and the host-vehicle 2, it is determined whether or not the proximity position A is closer to the host-vehicle 2 than the position threshold D. As shown in FIG. 4, La<Lb. When determined that the proximity position A is closer to the host-vehicle 2 than the position threshold D, the process proceeds to step S108.

In step S108, as shown in FIG. 4, the ECU 38 (proximity position changing unit 383) changes the proximity position A to a changed proximity position B which is closer to the host-vehicle 2 and is located outside of the waiting time generation area C. More specifically, the proximity position A is changed to the changed proximity position B so that the distance between the host-vehicle 2 and the changed proximity position La' will be shorter than the above described Lmin (La'<Lmin).

Then, the ECU 38 (travelling plan generating section 384) generates a travelling plan according to which, at the changed proximity position such as this, the host-vehicle 2 and the other vehicle 4 pass each other (or approach) with the host-vehicle being decelerated while the other vehicle being accelerated.

Specifically, as shown in FIG. 5, the speed of the host-vehicle is caused to be decelerated from Va to Va' so that the travel distance of the host-vehicle 2 within a predetermined time T will be shorter. Also, as shown in FIG. 6, the speed of the other vehicle 4 will be caused to be accelerated from Vb to Vb' so that the travel distance of the other vehicle 4 in the predetermined time T will be longer. Thus, the host-vehicle 2 and the other vehicle 4 pass each other at the changed proximity position B. Note that, in FIG. 5, the portion with a dotted line pattern shows the change (La'–La) in the traveling distance of the host-vehicle 2 due to the deceleration of the host-vehicle 2. Further, in FIG. 6, the portion with a dotted line pattern shows the change (La–La') of the traveling distance of the other vehicle 4 due to the acceleration of the other vehicle 4.

The deceleration Aa with which the speed of the host-vehicle is decelerated from Va to Va' as well as the acceleration Ab with which the speed of the other vehicle 4 is accelerated may be calculated in accordance with the Equations (4) to (6) below:

$$Va-Va'=2(La-La')/T \quad (4)$$

$$Aa=-(Va-Va')/T \quad (5)$$

$$Ab=(Va-Va')/T \quad (6)$$

It is to be noted that (Va–Va') in Equation (6) is equal to the change, (Vb'–Vb) in the speed of the other vehicle 4 (Va–Va'=Vb'–Vb).

The ECU 38 outputs a command to decelerate the host-vehicle 2 to the travel driving unit 36 to thereby decelerate the host-vehicle 2 based on the deceleration Aa of the host-vehicle 2 thus calculated. Further, the ECU 38 outputs a command of acceleration Ab via the communication unit 35 to the other vehicle 4. Thus, the other vehicle 4 first passes the waiting time generation area C, and both vehicles 2, 4 pass each other at the changed proximity position B. Thereafter, the host-vehicle 2 enters the waiting time generation area C.

Further, in step S107, when it is determined that the proximity position A coincides with the position threshold D as well, control proceeds to step S108, where, as described above, the ECU 38 generates a travelling plan that causes the host-vehicle to decelerate while accelerating the other vehicle to be executed by the travel driving unit 36 and transmits the traveling plan to the other vehicle 4 via the communication unit 4.

Meanwhile, in step 107, as shown in FIG. 7, when it is determined that La>Lb and the proximity position A is farther away from the host-vehicle 2 than the position threshold D to be closer to the other vehicle 4, then control proceeds to step S109.

In step S109, as shown in FIG. 7, the ECU 38 changes the proximity position A to the changed proximity position B so as to be farther away from the host-vehicle 2 to be closer to the other vehicle 4. In other words, the proximity position A is changed to the changed proximity position B so that the distance La' between the host-vehicle 2 and the changed proximity position B will be longer than the above described Lmax (La'>Lmax).

Then, a travelling plan is generated with which the host-vehicle 2 is accelerated while the other vehicle 4 is decelerated so as for the host-vehicle 2 and the other vehicle 4 to pass each other at the changed proximity position.

Specifically, as shown in FIG. 8, the speed of the host-vehicle 2 is caused to be accelerated from Va to Va' so that the travelling distance of the host-vehicle 2 within a predetermined time T will be longer. Also, as shown in FIG. 9, the speed of the other vehicle 4 will be caused to be decelerated from Vb to Vb' so that the travelling distance of the other vehicle 4 in the predetermined time T will be shorter. Thus, the host-vehicle 2 and the other vehicle 4 pass each other at the changed proximity position B. Note that, in FIG. 8, the portion with a dotted line pattern shows the change (La'–La) in the traveling distance of the host-vehicle 2 due to the acceleration of the host-vehicle 2. Further, in FIG. 9, the portion with a dotted line pattern shows the change (La–La') of the traveling distance of the other vehicle 4 due to the deceleration of the other vehicle 4.

The acceleration Aa with which the speed of the host-vehicle is accelerated from Va to Va' as well as the deceleration Ab with which the speed of the other vehicle 4 is decelerated may be calculated in accordance with the Equations (7) to (8) below:

$$Aa=(Va'-Va)/T \quad (7)$$

$$Ab=-(Va'-Va)/T \quad (8)$$

It is to be noted that "–(Va'–Va)" in Equation (8) is equal to the change, (Vb'–Vb) in the speed of the other vehicle 4 (Va–Va'=Vb'–Vb).

The ECU 38 outputs a command to accelerate the host-vehicle 2 to the travel driving unit 36 to thereby accelerate the host-vehicle 2 based on the acceleration Aa of the host-vehicle 2 thus calculated. Further, the ECU 38 outputs a command of deceleration Ab via the communication unit 35 to the other vehicle 4. Thus, the other vehicle 4 that has received a signal of deceleration Ab decelerates at the deceleration rate Ab. Consequently, without both vehicles being stopped, the host-vehicle first passes the waiting time generation area C, and both vehicles 2, 4 pass each other at the changed proximity position B. Thereafter, the other vehicle 4 enters the waiting time generation area C.

Now, a description is given when in step S104 the running scene of the host-vehicle 2 is determined in an intersection scene. Note that a description is given here in a case in which the host-vehicle 2 turns right at the intersection while the other vehicle of the oncoming lane runs straight.

Figure 10:
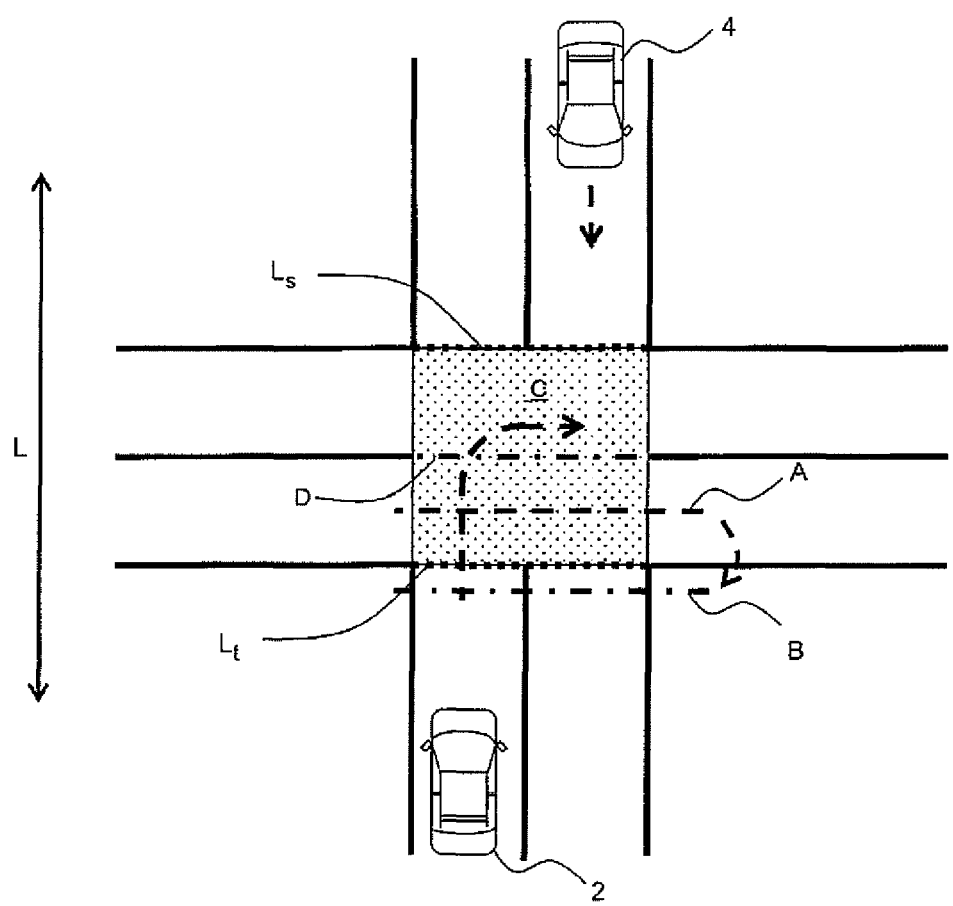
FIG. 10 is a diagram for explaining a driving control in the intersection scene in the first embodiment according to the present invention (part 1)
Figure 11:
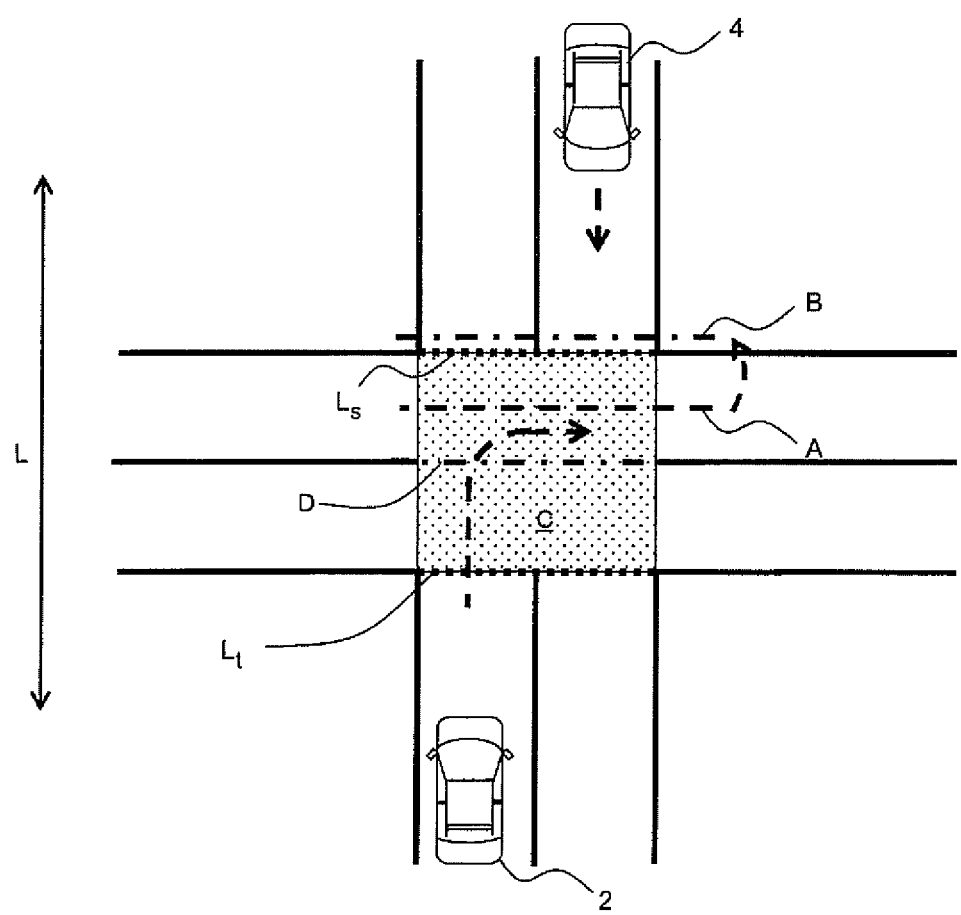
FIG. 11 is a diagram for explaining a driving control in the intersection scene in the first embodiment according to the present invention (part 2)

In the present exemplary embodiment, FIGS. 10 and 11 are diagrams illustrating a driving control in an intersection scene. The method of estimating the proximity position A in Step S105 is as described above. The ECU 38 estimates the proximity position A based on the position and speed of the host-vehicle 2 and the position and speed of the other vehicle 4.

In Step S106, the ECU 38 determines whether or not the proximity position A estimated in step S105 is located in the waiting time generation area C.

Here, the waiting time generation area C in the intersection scene refers to an area in which the host-vehicle 2 and the other vehicle 4 may possibly travel on the same lane at the same time since the host-vehicle 2 enters the opposite lane while turning right. More specifically, as shown in FIG. 10, the waiting time generation area C corresponds to the area extending the right-turn start position and right-turn end position of the host-vehicle (area where roads intersect). In other words, the waiting time generation area C in the intersection scene refers to the area in which such a situation occurs in which one of the host-vehicle 2 and the other vehicle 4 should stop to wait for the passage of the other one of the host-vehicle and the other vehicle. Note that, in the present embodiment, the waiting time generation area is described when the host-vehicle 2 turns right. However, the same holds true in the case of the waiting time generation area with the host-vehicle going straight and the other vehicle 4 turning right.

In Step S106, when it is determined that the proximity position A is not located in the waiting time generation area C, the driving control of the driving control unit 3 ends. On the other hand, in step S106, when it is determined that the proximity position A is located in the waiting time generation area C. it is considered that the host-vehicle 2 and the other vehicle 4 travel on the same lane at the same time, control proceeds to step S107.

In step S107, the ECU 38 sets the position threshold D in the waiting time generation area C. As shown in FIG. 10, the position threshold D at the intersection scene is set in the central part of the intersection.

Then, by comparing the distance between the proximity position A and the host-vehicle 2 with that between the position threshold D and the host-vehicle to the vehicle 2, it is determined whether or not the proximity position A is closer to the host-vehicle than to the position threshold D.

When the proximity position A is located at the same position of the position threshold D, or the proximity position A is determined to be closer to the host-vehicle 2 than to the position threshold D, control proceeds to step S108.

In step S108, as shown in the figure, the ECU 38 changes the proximity position A to a changed proximity position B which is closer to the host-vehicle 2 and located outside of the waiting time generation area C (in the vicinity of the outside of one end L1 constituting the waiting time generation area C shown in FIG. 10). Although not specifically shown, it is also possible to set the proximity position B to one end L1 of the waiting time generation area C.

Then, the ECU 38 generates a travelling plan to decelerate the host-vehicle 2 and to accelerate the other vehicle 4 in order for the host-vehicle 2 and the other vehicle 4 to pass each other while running. Thus, the travelling plan is executed by the travel driving unit 36 while the other vehicle 4 is caused to execute the travelling plan by transmitting the travelling plan to the other vehicle 4 via the communication unit 35. Consequently, without both vehicle being stopped, the other vehicle 4 first passes through the waiting time generation area C, and both vehicles 2, 4 pass each other at the changed proximity position B, and the host-vehicle finally enters the waiting time generation area C.

On the other hand, in step S107, as shown in FIG. 11, when it is determined that the proximity position A is farther away from the host-vehicle 2 than the position threshold D and closer to the other vehicle, the process proceeds to step S109.

In step S109, the ECU 38 changes the proximity position A to a changed proximity position B outside the waiting time generation area C (in the vicinity outside of an end Ls of the waiting time generation area C in FIG. 11) closer to the other vehicle. Although not specifically shown, it is also possible to set the proximity position B to the position of the one end Ls forming the waiting time generation area C.

Subsequently, the ECU 38 generates a travelling plan to decelerate the other vehicle 4 up to the position of the proximity position B such that the host-vehicle 2 and the other vehicle 4 would pass each other at the changed proximity position B. The generated travelling plan is executed by the travel driving unit 36 and the travel driving plan is transmitted to the other vehicle 4 via the communication unit 35 to be further executed by the other vehicle 4. As a result, without both vehicles 2, 4 being stopped, the host-vehicle 2 turns right at the intersection and passes the waiting time generation area C first, then both vehicles 2, 4 pass each other at the changed proximity position B, and finally the other vehicle enters the waiting time generation area C to pass through the intersection.

As described above, in the intersection scene in the present embodiment, based on the position of the proximity position A with respect to the position threshold D, a travelling plan is created for the host-vehicle and the other vehicle 4. However, this process is not limited. For example, in both vehicles 2, 4, such a travelling plan may be generated for execution according to which one of the vehicles that reaches the waiting time generation area C first is caused to pass through first and the other vehicle is then caused to enter the waiting time generation area C.

Now, in step S104, a description is given of steps 105 to 109 where the travel or driving scene of the host-vehicle 2 is determined in a merging scene by the ECU 38. Note that a case is described here in which the host-vehicle 2 turns left in a T-intersection and merges or joins the road the other vehicle 4 is travelling.

Figure 12:
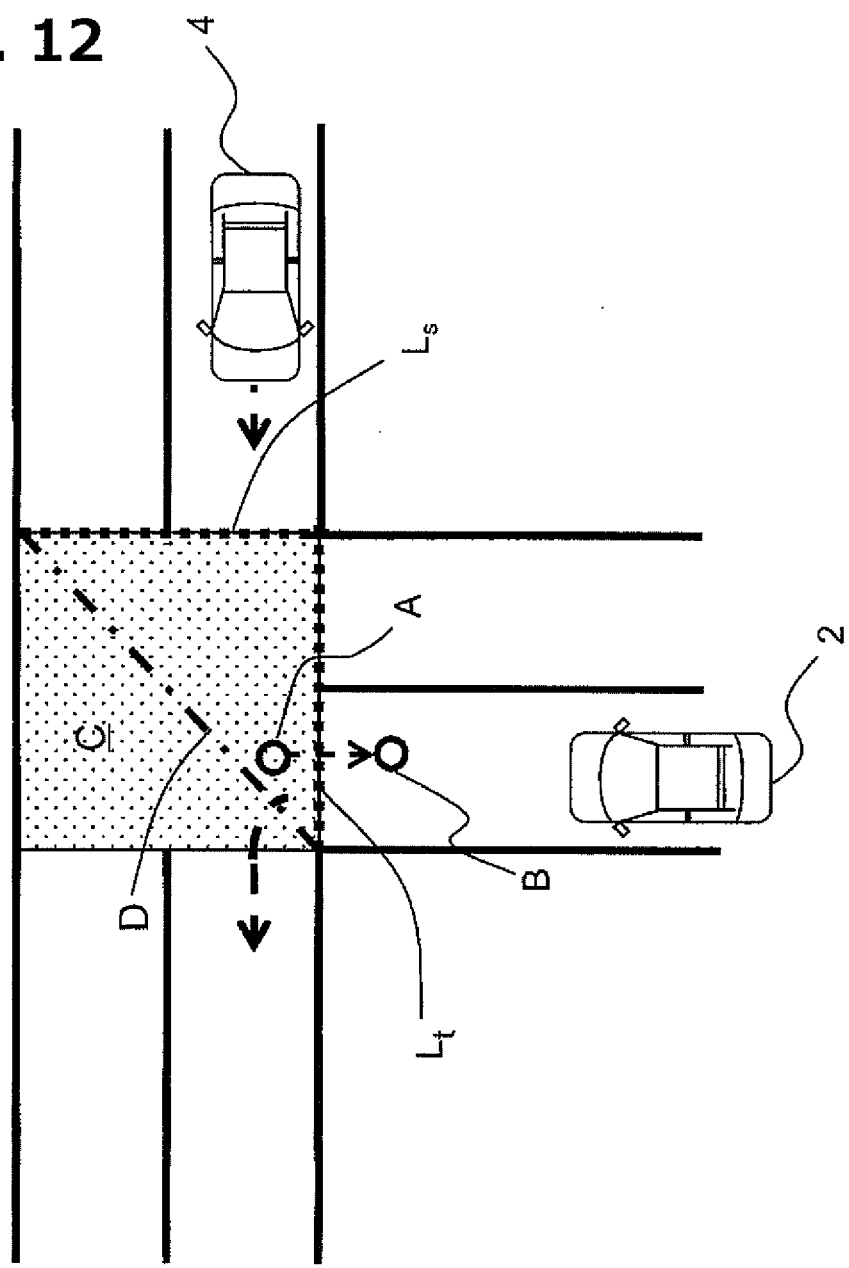
FIG. 12 is a diagram explaining a driving control of a merging scene in the first embodiment according to the present invention (part 1)
Figure 13:
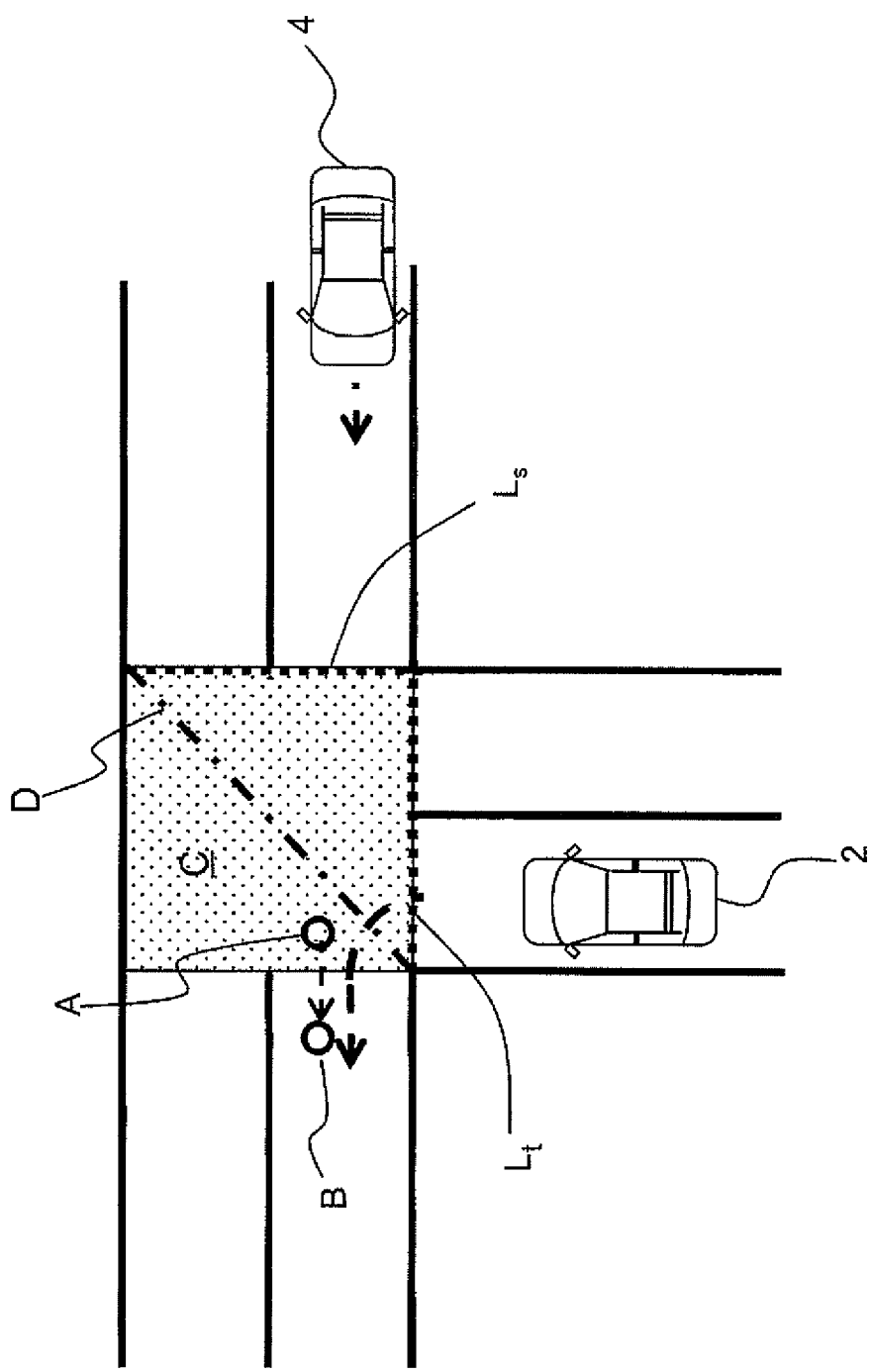
FIG. 13 is a diagram explaining a driving control of a merging scene in the first embodiment according to the present invention (part 2)

In the present exemplary embodiment, FIGS. 12 and 13 are diagrams illustrating a driving control in the merging scene. The method of estimating the proximity position A in step S105 is similar to that described above, and, based on the position and speed of the host-vehicle 2 as well as the position and speed of the other vehicle 4, the ECU 38 estimates the proximity position A at which the travelling host-vehicle 2 and the other vehicle 4 approach each other.

In step S106, the ECU 38 determines whether or not the proximity position A estimated in step S105 is located in the waiting time generation area C.

Here, the waiting time generation area C in the merging scene refers to an area in which the host-vehicle 2 and the other vehicle 4 may possibly travel on the same lane at the same time since the host-vehicle 2 enters the travel lane of the other vehicle (a lane that crosses with the travel lane of the host-vehicle 2) while merging. More specifically, as shown in FIG. 12, the waiting time generation area C corresponds to the area extending the left-turn start position and left-turn end position of the host-vehicle 2. In other words, the waiting time generation area C refers to the area in which such a situation occurs in which one of the host-vehicle 2 and the other vehicle 4 has to stop to wait for the passage of the other one of the host-vehicle and the other vehicle. Note that, in the present embodiment, the waiting time generation area C refers to a crossing portion at which the entire road of travel of the host-vehicle 2 crosses with the entire road of travel of the other vehicle 4. However, it is sufficient that the waiting time generation area C includes at least a portion at which the travel lane of the host-vehicle 2 and the travel lane of the other vehicle 4 intersect each other.

In step S106, when it is determined that the proximity position A is not located within the waiting time generation area C, the driving control by the driving control unit 3 ends. When determined that the proximity position A is located in the waiting time generation area C, it is considered that the host-vehicle 2 and the other vehicle 4 would travel on the same lane at the same time, control proceeds to step S107.

In step S107, the ECU 38 sets a position threshold position D in the waiting time generation area C. The position threshold D in the intersection scene is defined, as shown in FIG. 12, by a diagonal line so as to bisect the angle (90 degrees in this embodiment) with which the host-vehicle 2 turns left.

Then, the ECU 38 compares the distance between the proximity position A and the host-vehicle 2 and the distance between the defined position threshold D and the host-vehicle 2 to determine whether or not the proximity position A is closer to the host-vehicle than the position threshold D.

When determined that the proximity position A and the position threshold D is the same position or, as shown in FIG. 12, when the proximity position A is closer to the host-vehicle 2 than the position threshold D, control proceeds to step S108. Note that the proximity position A is indicated by "○" mark in FIG. 12.

In step S108, as shown in the figure, the ECU 38 changes the proximity position A to a changed proximity position B, outside of the waiting time generation area C to bring closer to the host-vehicle. Subsequently, the ECU 38 generates a travelling plan according to which the host-vehicle 2 is decelerated while to accelerate the other vehicle such that the host-vehicle 2 and the other vehicle 4 would pass each other while both being running. To this end, the travelling plan is executed by the travel driving system 36 and the travelling plan is transmitted to the other vehicle 4 via the communication unit 35 to cause the other vehicle to execute the travelling plan. As a result, without both vehicles being stopped, the other vehicle passes through the waiting time generation area C earlier, and both vehicles 2, 4 pass each other at the changed proximity position B. Finally, the host-vehicle 2 enters the waiting time generation are C.

Meanwhile, in step S107, as shown in FIG. 13, when it is determined the proximity position A is farther from the host-vehicle 2 than to the position threshold D, the process proceeds to step S109.

In step S109, as shown in the figure, the ECU 38 changes the proximity position A to a changed proximity position B outside of the waiting time generation area so as to be away from the host-vehicle 2. Subsequently, the ECU 38 prepares a travelling plan according to which the host-vehicle 2 is caused to turn left first while the other vehicle 4 is decelerated up to the position of one end Ls of the waiting time generation area on the side of the other vehicle 4. The travelling plan thus prepared is then executed by the travel driving system 36, and, at the same time, the travelling plan is caused to be transmitted to the other vehicle 4 via the communication unit 35. As a result, without both vehicles 2, 4 being stopped, the host-vehicle passes through the waiting time generation area C first, and then the other vehicle 4 enters the waiting time generation area C so as to cause both vehicles 2, 4 to approach each other.

Note that, in the merging or joining scene in the present embodiment, the driving control is performed on the basis of the position threshold D. However, this is not particularly limited. For example, a driving control may be executed for both vehicles 2,4 such that the one of the host-vehicle and the other vehicle is caused to pass through, and the other one the host-vehicle and the other vehicle is allowed to enter the waiting time generation area C.

In the present embodiment, since the proximity position is located in the waiting time generation area, when the host-vehicle 2 and the other vehicle 4 travel on the same lane at the same time, the proximity position is changed to a changed proximity position outside of the waiting time generation area in order to perform a driving control such that, while both running vehicles are caused to approach each other at the changed proximity position, after one of the host-vehicle and the other vehicle has passed through the waiting time generation area, the other one of the host-vehicle and the other vehicle is configured to enter the waiting time area. Therefore, in the present exemplary embodiment, it is possible to reduce the waiting time of the vehicle in the waiting time generation area.

Further, in the present exemplary embodiment, a position threshold is set, and, since the proximity position is changed closer to either the host-vehicle or the other vehicle based on a determination result of whether or not the proximity position is closer to the vehicle as compared to the position threshold, it is possible to allow the vehicle closer to the waiting time generation area to pass through first.

Here, in the present exemplary embodiment, as described above, since the vehicle closer to the waiting time generation area is caused to pass through first, it is possible to make a travelling plan that does not significantly change the running state of the host-vehicle and the other vehicle.

For example, in the example shown in FIG. 4, if the proximity position is changed to come closer to the other vehicle, rapid acceleration is required in the host vehicle while sudden braking is required for the other vehicle. In contrast, in the present exemplary embodiment, on the basis that the proximity position is closer to the host-vehicle than the position threshold, the proximity position is changed to a changed proximity position closer to the host-vehicle. Thus, a driving control is possible with a travelling plan according to which the host-vehicle may cope with the situation by gentle or moderate deceleration and the other vehicle may respond in gentle acceleration. Thus, in the present exemplary embodiment, stress may hardly be given to the driver.

Further, in the present exemplary embodiment, since the position threshold is set in the middle of the waiting time generation area, it is possible to accurately determine which of the host-vehicle and the other vehicle is closer to the waiting time generation area.

Moreover, in the present exemplary embodiment, with respect to the host-vehicle and the other vehicle, the one vehicle closer to the waiting time generation area is caused to accelerate, and the other vehicle far from the waiting time generation area is allowed to decelerate. Thus, in the present exemplary embodiment, in the waiting time generation area, it is possible that both vehicles pass through the waiting time generation area smoothly. That is, in the present exemplary embodiment, it is possible to smooth the traffic flow.

Further, in the present exemplary embodiment, since it is determined whether or not to execute a driving control depending on whether or not the proximity position is located in a waiting time generation area, the driving control may be performed only when necessary. Thus, an unnecessary driving control is suppressed to be performed when there is no possibility that the waiting time generation is expected.

In the present exemplary embodiment, the driving control is different from the first exemplary embodiment in that, in step S108 and step S109, the host-vehicle and the other vehicle are controlled to travel at a constant speed to a changed proximity position. However, the portions other than these are the same. The following describes only the portions which are different from the first exemplary embodiment, and the portions identical to the first exemplary embodiment, description thereof is omitted with the same reference numerals added. In the present exemplary embodiment, a description will be given of a driving control of the obstacle avoidance scene in a single path.

Figure 14:
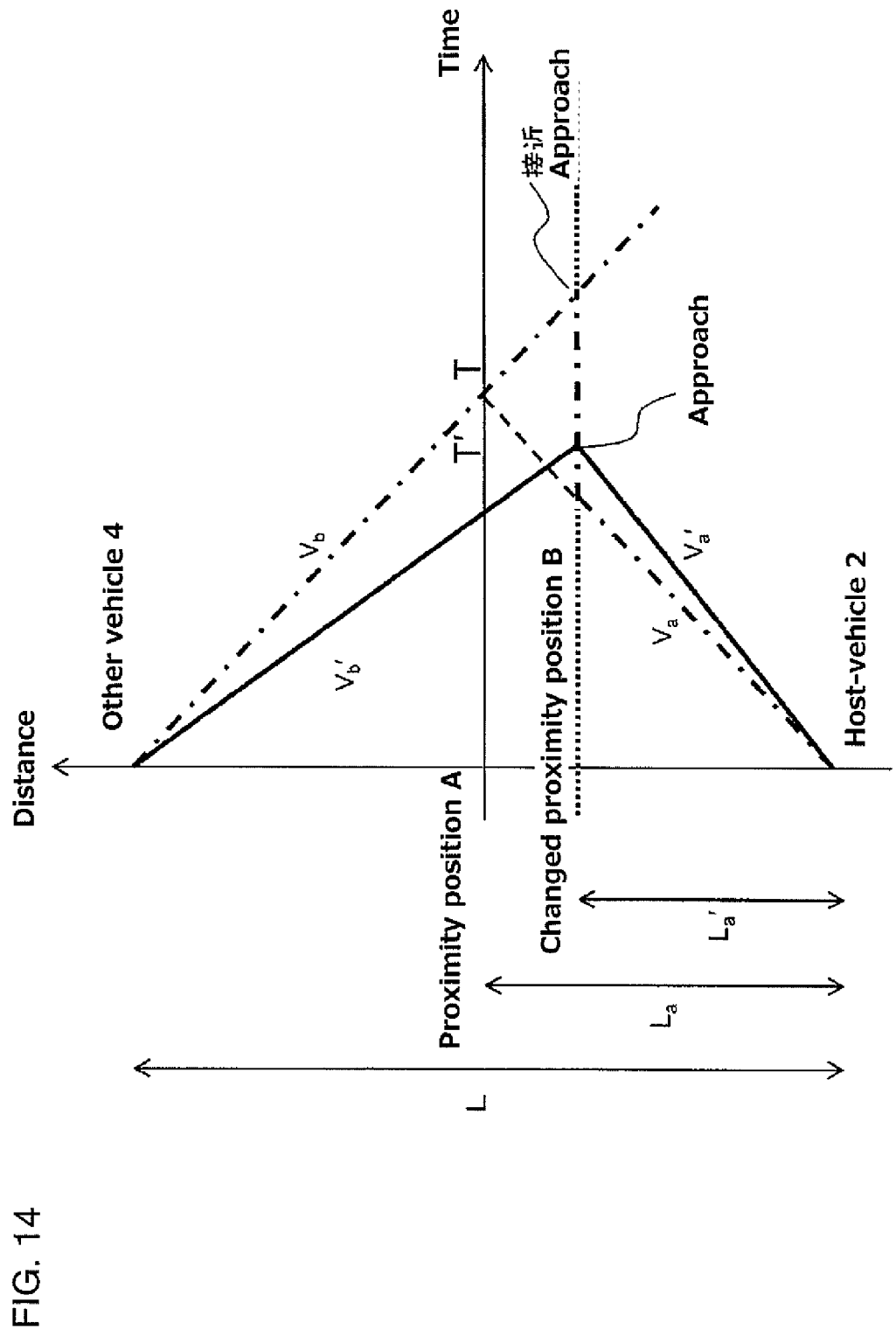
FIG. 14 is a graph illustrating the travelling plan of the host-vehicle in a second exemplary embodiment according to the present invention.

FIG. 14 is a graph illustrating a travelling plan of the host-vehicle and the other vehicle in the present exemplary embodiment. In FIG. 14, "L" denotes the distance between the host-vehicle 2 and the other vehicle 4, "La" denotes the distance between the host-vehicle 2 and a proximity position, and "La'" denotes the distance between the host-vehicle and a changed proximity position, respectively. Further, a solid line in FIG. 14 represents a state of travel of the two vehicles 2, 4 based on a driving control in the present exemplary embodiment. On the other hand, a dashed line in FIG. 14 shows a state of travel of both vehicles 2, 4 when not performing the driving control in the present exemplary embodiment, and illustrates that the host-vehicle stops ahead of the proximity position (changed proximity position B) and is waiting for the passage of the other vehicle after elapse of time 'T' at the proximity position where the obstacle exists in order to avoid to be close to the other vehicle.

In step S108 in the present embodiment (where the proximity position A is closer to the host-vehicle than the position threshold D), a travelling plan is generated such that, at a changed proximity position (at a position of La' away from the host-vehicle), the speed of the host-vehicle 2 is caused to be reduced from Va to Va' to allow the host-vehicle 2 to travel at speed Va' up to the changed proximity position B while accelerating the speed of the other vehicle 4 from Vb to Vb' to allow for the other vehicle to travel at Vb' up to the changed proximity position B. The travelling plan is caused to be executed by the travel driving system 36 while transmitting the travelling plan to the other vehicle 4 via the communication unit 35.

As a result, as shown in FIG. 14, in order for both vehicles 2, 4 pass each other at a changed proximity position B outside of the waiting time generation area C, at the time "T" after starting the driving control, the other vehicle 4 passes through the waiting time generation are C first, and the host-vehicle 2 follows and passes through the waiting time generation area.

Although not shown in particular, similarly in step S109 (where the proximity position A is farther from the host-vehicle, and closer to the other vehicle), a travelling plan is generated such that, at a changed proximity position B outside of the waiting time generation area C and close to the other vehicle 4, in order for the host-vehicle 2 and the other vehicle 4 to come closer, the host-vehicle 2 is caused to accelerate to travel at a predetermined speed up to the changed proximity position B while decelerating the other vehicle 4 to allow to travel at a predetermined speed up to the changed proximity position B. The travelling plan will be executed by the driving control unit 36, while the travelling plan is transmitted to the other vehicle 4 via the communication unit 35.

As a result, in order for both vehicles 2, 4 to pass each other at the changed proximity position B outside of the waiting time generation area C after elapse of a predetermined time of driving control start, the host-vehicle 2 passes through the waiting time generation area C first, and the other vehicle 4 subsequently passes through the waiting time generation area.

As in the first embodiment, also in the present exemplary embodiment, since the proximity position is located in the waiting time generation area, when the host-vehicle 2 and the other vehicle 4 drives the same lane at the same time, the proximity position is changed to a changed proximity position outside of the waiting time generation area. Thus the driving control is performed such that, while allowing the both running vehicles approach each other at the changed proximity position, after one of the host-vehicle and the other vehicle has passed through the waiting time generation area, the other one of the host-vehicle and the other vehicle may enter the waiting time generation area. Therefore, in the present exemplary embodiment, in the waiting time generation area, it is possible to reduce the waiting time of the vehicle.

Further, as in the first exemplary embodiment, also in the present exemplary embodiment, a position threshold is set, and, since the proximity position is changed closer to either the host-vehicle or the other vehicle based on a determination result of whether or not the proximity position is closer to the vehicle as compared to the position threshold, it is possible to allow the vehicle closer to the waiting time generation area to pass through first. Furthermore, in the present exemplary embodiment as well, it is possible to perform a driving control in accordance with a travelling plan that is less likely to give stress to the driver without changing the running states of the host-vehicle and the other vehicle significantly.

Further, as in the first embodiment, also in the present exemplary embodiment, with respect to the host-vehicle and the other vehicle, one vehicle that is closer to the waiting time generation area is caused to accelerate, and the other vehicle that is far from the waiting time generation area is then caused to slow down. Thus, in the present exemplary embodiment, it is possible to allow both vehicles to pass through the waiting time generation area without causing the two vehicles to stop. That is, in the present exemplary embodiment, it is possible to smooth the flow of traffic.

As in the first embodiment, also in the present exemplary embodiment, since it is determined to execute the driving control or not according to whether or not the proximity position is located in the waiting time generation area, the driving control may be executed only when necessary. Thus, an unnecessary driving control is suppressed to be performed when there is no possibility that the waiting time is generated.

The GPS receiver 31 and the position/speed detecting section 381 in the first and second exemplary embodiments correspond to an example of a host-vehicle position detecting means according to the present invention. The wheel speed sensor 34 and the position/speed detecting section 381 in the first and second exemplary embodiments correspond to the host-vehicle speed detecting means according to the present invention. The communication unit 35 in the first and second embodiments corresponds to one example of the acquisition unit and the transmission unit according to the present invention. The proximity position estimation section 382 in the first and second embodiments corresponds to one example of the proximity position estimation means according to the present invention. The proximity position changing section 383 in the first and second embodiments corresponds to an example of the proximity position changing means according to the present invention. The travelling plan generating section 384 in the first and second embodiments corresponds to the travelling plan generating means according to the present invention. The travel driving unit 36 in the first and second embodiments corresponds to an example of the travel driving means according to the present invention. Finally, the waiting time generation area C in the first and second embodiments corresponds to an example of a predetermined area according to the present invention.

Figure 15:
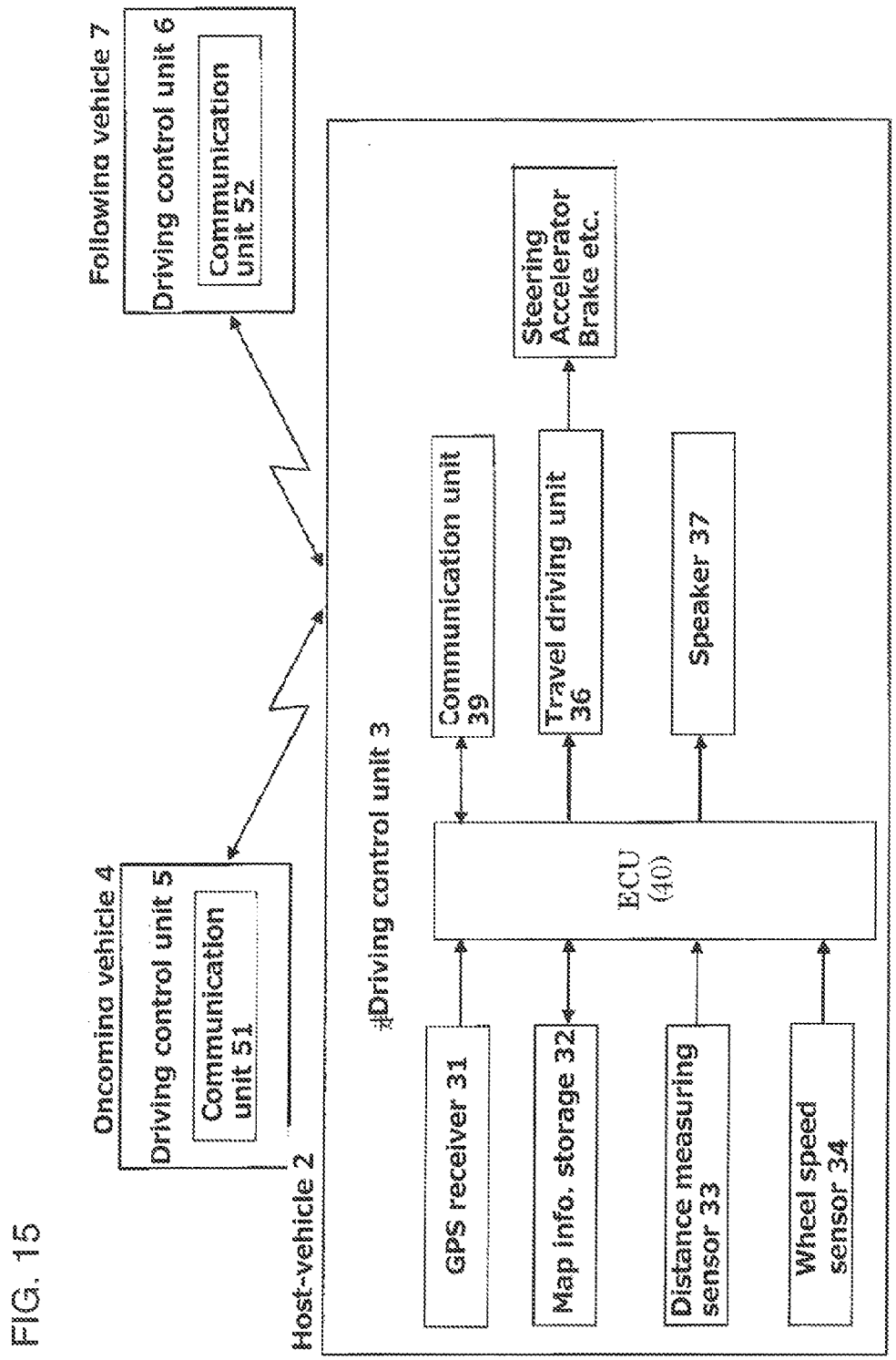
FIG. 15 is a functional block diagram illustrating the configurations of the driving control system in a third exemplary embodiment according to the present invention.
Figure 16:
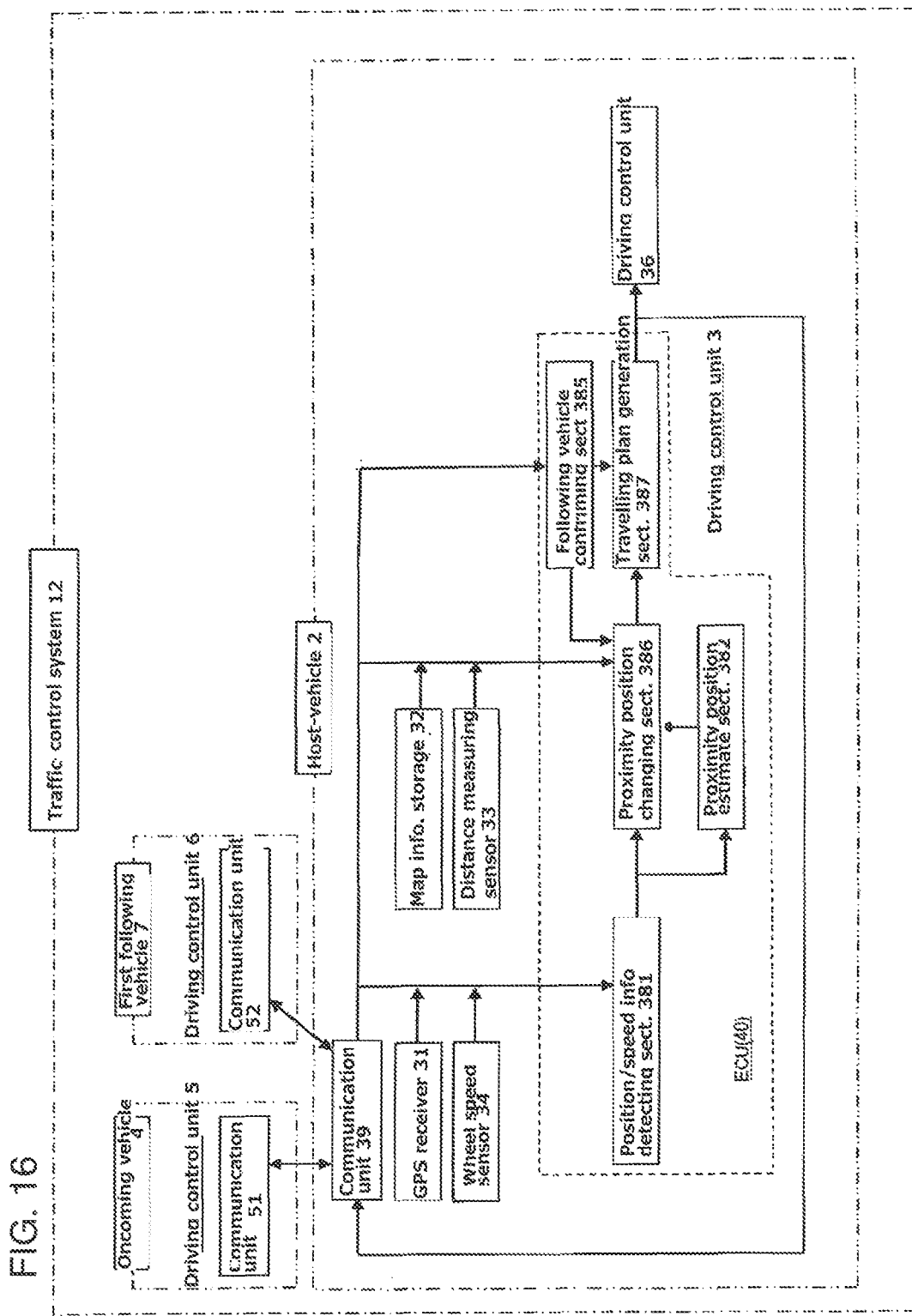
FIG. 16 is a functional block diagram illustrating the functions of the driving control system in a third exemplary embodiment according to the present invention.

FIG. 15 is a block diagram showing the structure of the driving control system in the present exemplary embodiment, and FIG. 16 is a functional block diagram illustrating the function of the driving control system in the present embodiment.

The traffic control system in the present exemplary embodiment is shown in FIG. 15 and FIG. 16 and is different from the traffic control system 1 in the first exemplary embodiment in that the host-vehicle 2 is provided with a communication unit 39 and an ECU 40. Other than these portions, the structure is the same. Therefore, a description is given below of the different portions only, and the description of the same parts will be omitted with the same reference numerals attached.

The communication unit 39 is provided, in addition to a function held by the communication unit 35 described in the first embodiment (i.e. function to execute a wireless communication with the other vehicle 4 that is driven towards the host-vehicle 2 (referred to as an oncoming vehicle 4), a function to perform a wireless communication with a following vehicle 7 that follows behind the host-vehicle 2 (hereinafter referred to as a first following vehicle 7). The communication unit 52 receives a signal indicating the presence of a following vehicle 7 from the communication unit 52 of the first following vehicle 7 and outputs the signal to the ECU 40. Further, in response to a command from the ECU 40, the communication unit 39 transmits a signal of a travelling plan to the communication unit 52 of the first following vehicle 7.

Similarly to the communication unit 51 of the other vehicle 4 as described in the first embodiment, the communication unit 52 of the first following vehicle 7 transmits a signal indicating the presence of the first following vehicle itself to the host-vehicle travelling ahead, and receives a travelling plan from the host-vehicle. Incidentally, even if still another following vehicle (hereinafter referred to as a second following vehicle) is present behind the first following vehicle 7, through a method similar to that described above, direct communication takes place between the second following vehicle and the host-vehicle 2.

As for a method for detecting the presence of the second following vehicle, a signal that has been transmitted from the second following vehicle may be received by the host-vehicle 2 though the first following vehicle 7. Further, the method of detecting the presence of the first following vehicle 7 is not limited to the method described above. For example, by mounting a following vehicle detection device such as a laser range finder or the like mounted towards in the rear direction of the host-vehicle 2, it is possible to detect the presence of the following vehicle.

The ECU 40 is a computer that has a function of executing the driving support or assistance of the host-vehicle 2 based on various signals acquired from a distance measuring sensors 33, the wheel speed sensor 34 and the communication unit 39 and the like. Similar to ECU 38 in the first exemplary embodiment, the ECU 40 includes a position/speed information detecting section 381 and a proximity position estimation section 382. The ECU 40 is different from the ECU 38 in that (1) a following vehicle confirming section 385 is added, and (2) the proximity position changing section 386 and the travelling plan generating section 387 are modified.

As shown in FIG. 16, the following vehicle confirming section 385 detects the presence of the first following vehicle 7 based on a signal indicative of the presence of the first following vehicle 7, which is output from the communication unit 52 of the first following vehicle 7 and received by the communication unit 39. Further the following vehicle confirming section 385 is capable of calculating the total number of following vehicles by counting the number of signals indicating the presence of the following vehicles. Moreover, the following vehicle confirming section 385 is capable of outputting the information about the presence of the following vehicles and the number thereof to the proximity position changing section 386 and the travelling plan generating section 387 to be described below.

The proximity position changing section 386 is capable of changes a changed proximity position B to another changed proximity position B2 based on the information about the number of following vehicles output from the following vehicle confirming section 385, in addition to the function held by the proximity position changing section 383 described in the first exemplary embodiment.

The travelling plan generating section 387 has the following functions in addition to the function held by the travelling plan generating section 384 as described in the first embodiment. That is, the travelling plan generating section 387 is capable of generating a third to sixth travelling plans described below based on the presence and the number of the following vehicles output from the following vehicle confirming section 385, in addition to the first travelling plan (corresponding to step S108 in FIG. 3) described above and the second travelling plan (corresponding to step S109 in FIG. 3).

Figure 17A:
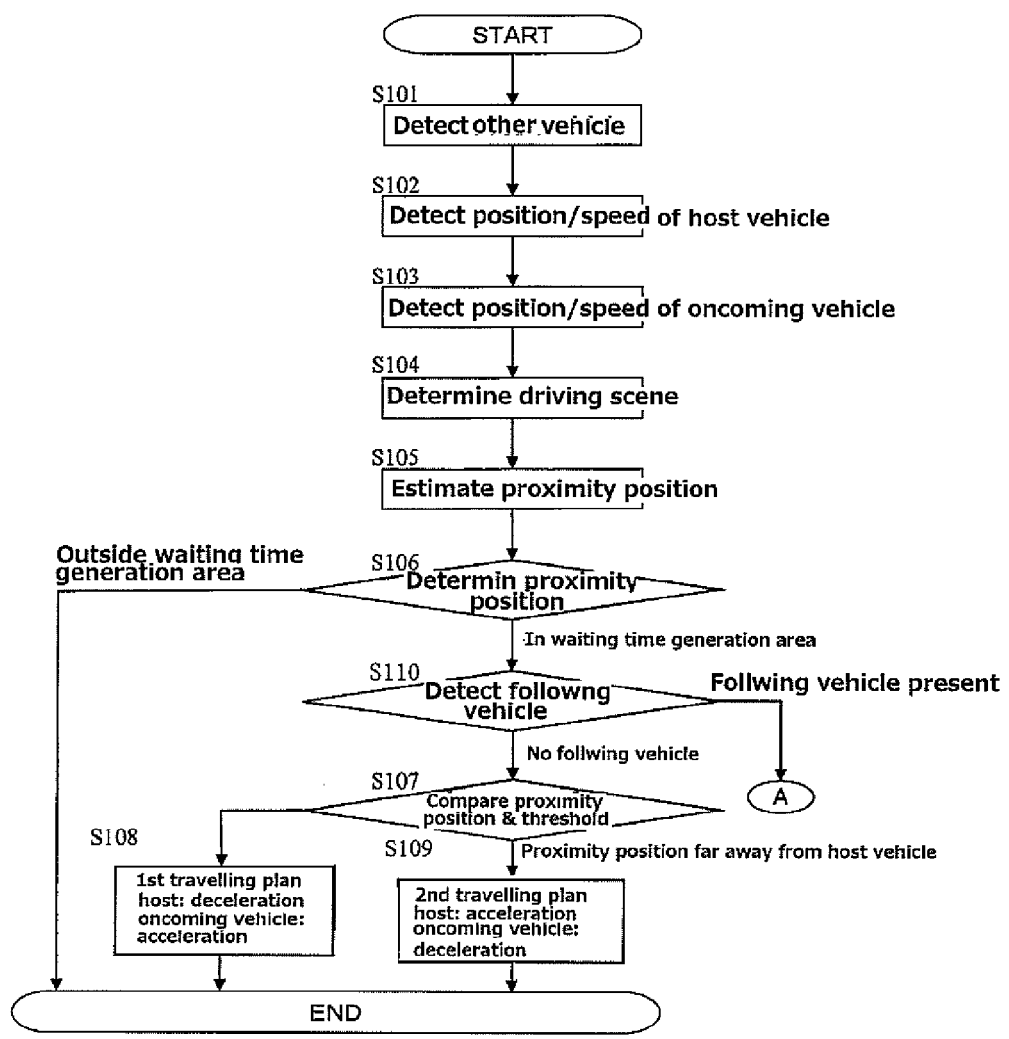
FIG. 17A is a flowchart illustrating a procedure of driving control of the driving control system in the third exemplary embodiment according to the present invention.
Figure 17B:
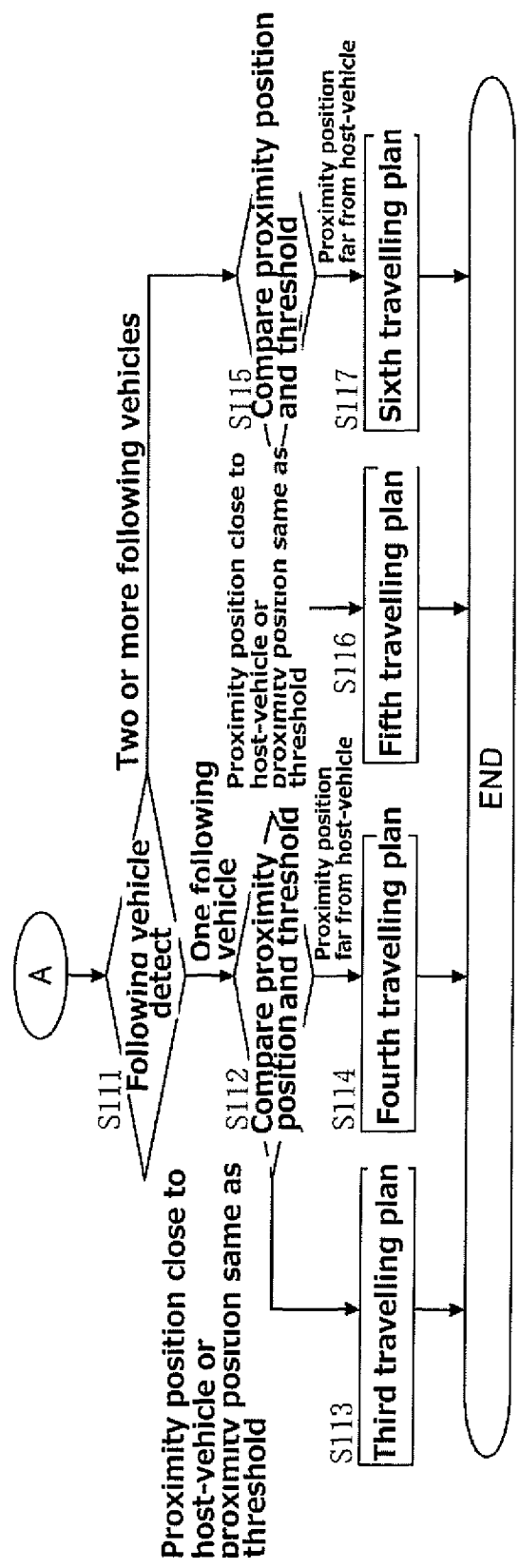
FIG. 17B is a flowchart illustrating a procedure of driving control of the driving control system in the third exemplary embodiment according to the present invention.

Now a description is given of control procedure of the driving control system in the present exemplary embodiment with reference to FIG. 17A and FIG. 17B. The description of the portions identical to the first exemplary embodiment is omitted and the same reference numerals are attached.

Figure 19:
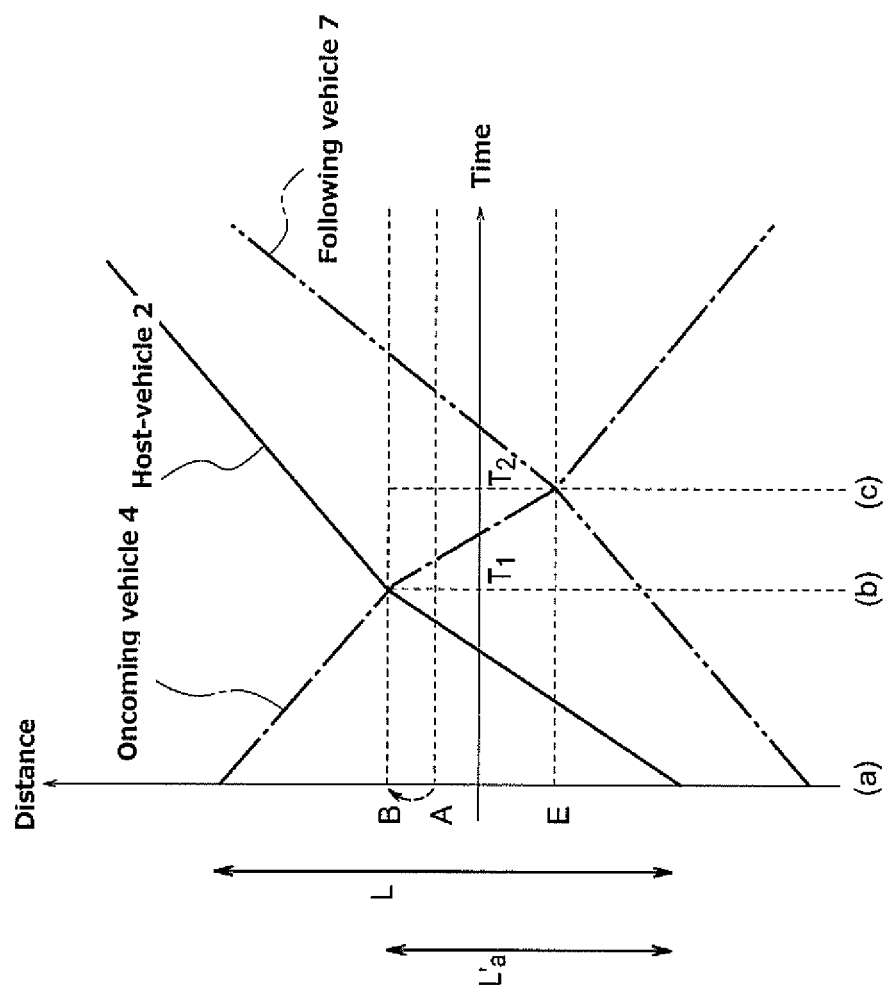
FIG. 19 is a graph explaining the third travelling plan in the third exemplary embodiment according to the present invention.
Figure 22:
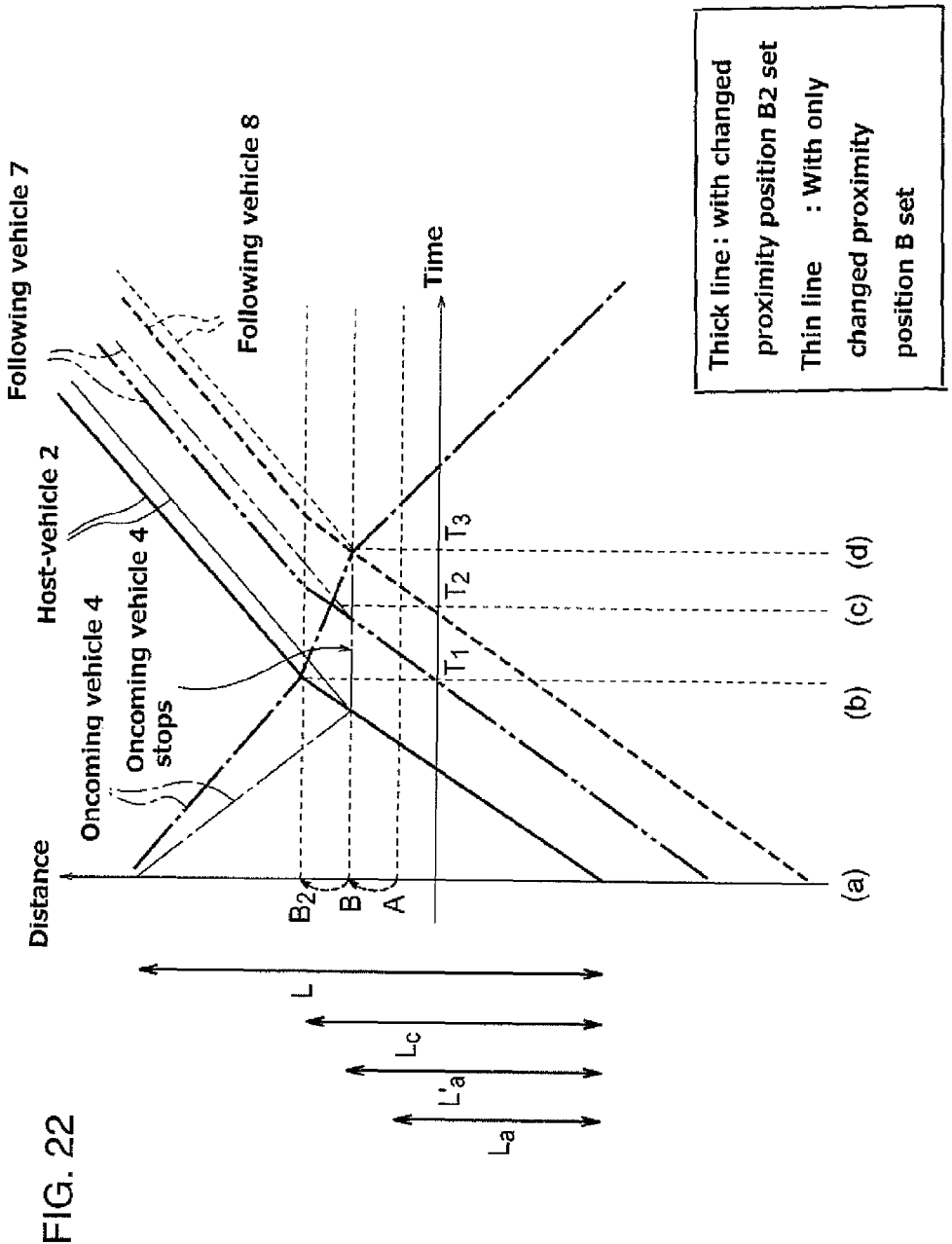
FIG. 22 is a graph explaining a sixth travelling plan in the third exemplary embodiment according to the present invention.

FIGS. 17A and 17B are the flowcharts showing a procedure of driving control of the driving control system according to the present exemplary embodiment, and FIGS. 18, 20, 21, and 23 are top views explaining a third to a sixth travelling plans. Further, FIGS. 19 and 22 are graphs explaining the third and sixth travelling plan in the present exemplary embodiment.

In the present exemplary embodiment, the description of steps S101 to S106 is omitted since these are similar as steps S101 to S106 in the first exemplary embodiment.

In FIGS. 17A and 17B, in step S110, the communication unit 39 of the host-vehicle 2 receives a signal transmitted from the communication unit 52 of the first following vehicle 7 and output the signal to the ECU 40 (following vehicle confirming section 385) to thereby detect the presence of a first following vehicle 7.

In step S110, when the presence of the following vehicle is not detected, the process proceeds to step S107. Note that step S107, step S108 indicative of a first travelling plan, and step S109 indicative of a second travelling plan are the same as steps S107 to S109 respectively in the first exemplary embodiment. Thus, the descriptions are omitted.

In step S110, when the presence of a first following vehicle 7 is detected, the number of the following vehicles is detected in step S111. Specifically, by counting the number of signals output from the communication unit 52 of the first following vehicle 7 and the communication unit (not shown) of the second following vehicle and received at the communication unit 39 of the host-vehicle 2, the ECU 40 (following vehicle confirming section 385) detects the total number of the following vehicles.

When one following vehicle is detected in step S111, in step S112, using a method similar to that in step S107, the proximity position between the host-vehicle 2 and the oncoming vehicle 4 is compared to a position threshold D. When it is determined that the distance La between the proximity position A and the host-vehicle 2 is shorter than the distance between the position threshold D and the host-vehicle 2 (La<Lb) and the proximity position A is closer to the host-vehicle 2 than the position threshold D, control proceeds to step S113.

In step S113, as shown in FIG. 18, first, the ECU 40 (proximity position changing section 386) changes the proximity position A between the host-vehicle and the oncoming vehicle 4 to a changed proximity position B so as to approach the host-vehicle 2, outside of the waiting time generation area. Although not specifically shown, it is also possible to set the proximity position B at one end Lt of the waiting time generating area C.

Then, the ECU 40 (travelling plan generating section 387) generates a third travelling plan according to which, while the oncoming vehicle being accelerated, the host-vehicle and the first following vehicle 7 slow down to the changed proximity position B (FIG. 18(a)), the oncoming vehicle 4 and the host-vehicle pass each other at the changed proximity position B (FIG. 18(b)), and the host-vehicle 2 and the first following vehicle 7 pass through the waiting time generation area C.

Then, the ECU 40 causes the travel driving unit 36 to execute the third travelling plan and, at the same time, transmits the third travelling plan to the communication unit 51 of the oncoming vehicle 4 via the communication unit 39 and to the communication unit 52 of the first following vehicle 7.

Thereafter, the oncoming vehicle 4 receives the third travelling plan at the communication unit 51 to run the third travelling plan. Further, the first following vehicle 7 receives the third travelling plan at the communication unit 52 and executes the third travelling plan.

When it is determined in step S112 that the proximity position A is in the same position as the position threshold D, the process also proceeds to step S113 where the third travelling plan will be executed.

On the other hand, in step S112, when it is determined that the distance La between the proximity position A and the host-vehicle 2 is longer than the distance Lb between the position threshold D and the host-vehicle 2, and the proximity position A is farther from the host-vehicle than the position threshold D, process proceeds to step S114.

Figure 20C:
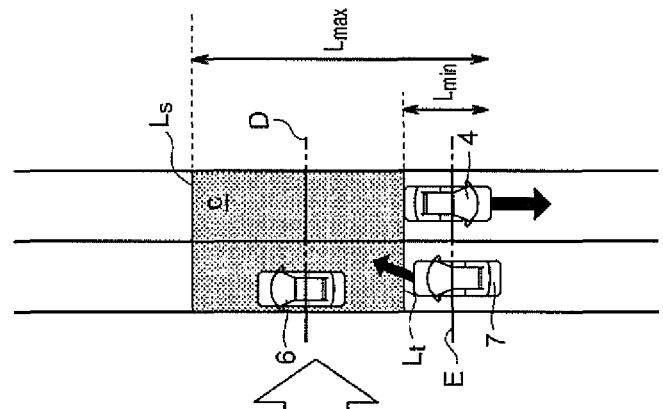
FIGS. 20A-20C are top views explaining a fourth travelling plan in the third exemplary embodiment according to the present invention.
Figure 20B:
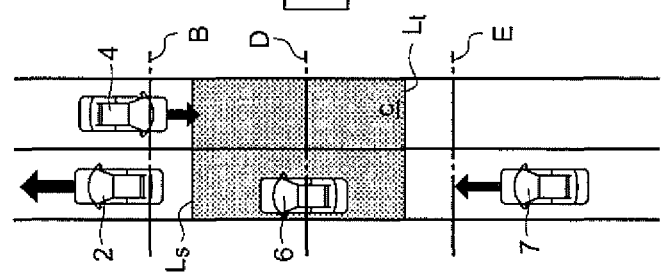
Figure 20A:
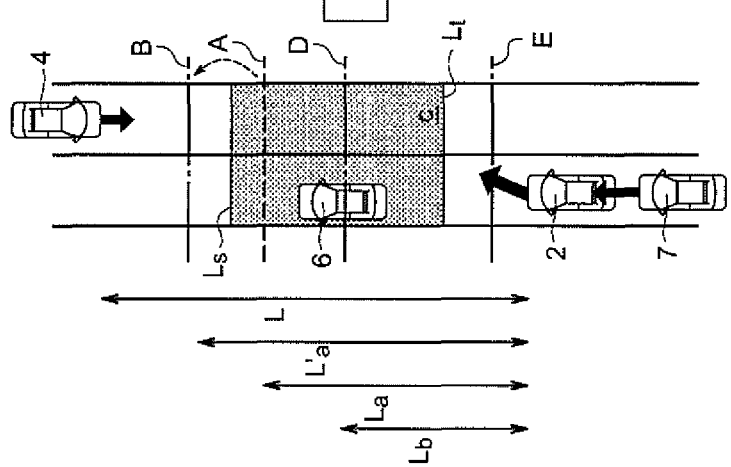

In step S114, as shown in FIG. 19 and FIG. 20, first, the ECU 40 (proximity position changing section 386) changes the proximity position A between the host-vehicle 2 and the oncoming vehicle 4 to a changed proximity position B to come closer to the oncoming vehicle 4 outside the waiting time generation area C. Although not specifically shown, it is also possible to set the proximity position B to the position of one end Ls of the waiting time generation area C.

Then, the ECU 40 (travelling plan generating section 387), upon setting the following proximity position E, prepares a fourth travelling plan described below. According to the fourth travelling plan, when the driving control is started at point a in FIG. 19, while the host-vehicle 2 is being accelerated, the oncoming vehicle 4 decelerates up to the changed proximity position B. Thus, the host-vehicle 2, after having passed through the waiting time generation area C, passes the oncoming vehicle 4 at the changed proximity area after elapse of time T1 of the driving control start at point b (FIG. 19, FIG. 20(b)). Thereafter, the oncoming vehicle 4 accelerates to the following proximity position E while passing through the waiting time generation area C. On the other hand, the first following vehicle 7 continues to slow down after start of the driving control, and, at elapse of time T2, passes the oncoming vehicle 4 at the following proximity position E at point c (FIG. 19 and FIG. 20 (c)). Thereafter, the first following vehicle 7 passes through the waiting time generation area C.

Here, the following proximity position E refers to a position located outside of the waiting time generation area and to be set closer to the first following vehicle 7, at which the oncoming vehicle 4 and the first following vehicle 7 can pass each other while running (i.e. without both being stopped). Note that the following proximity position E may be set at the position of one end Lt of the waiting time generation area C.

Then, the ECU 40 causes the travel driving unit 36 to execute the fourth travelling plan and at the same time transmits the fourth travelling plan to the communication unit 51 of the oncoming vehicle 4 via the communication unit 39 and to the communication unit 52 of the first following vehicle 7.

Thereafter, the oncoming vehicle 4 receives the fourth travelling plan at the communication unit 51, and executes the travelling plan. Also, the first following vehicle 7 receives the fourth travelling plan by the communication unit 52 to execute the travelling plan.

In this way, it is possible to suppress the deceleration of each vehicle, thereby further reducing stress on the driver by allowing the host-vehicle, the other vehicle, and the following vehicle to pass through the waiting time generation area alternately.

Now, in step S111, a description is given of a case in which two or more following vehicles are detected. As an example, explanation is made of a case where there are two cars behind (first following vehicle 7, and second following vehicle 8). When it is detected in step S111 that two or more following vehicles are present, control proceeds to step S115.

In step S115, using a method similar to the step S107, the proximity position A between the host-vehicle 2 and the other vehicle 4 is compared with a position threshold D. When it is determined that the distance La between the proximity position A and the host-vehicle 2 is shorter than the distance Lb between the proximity position D and the host-vehicle 2 (La<Lb) and the proximity position A is closer to the host-vehicle 2 than the position threshold D, control proceeds to step S116

In step S116, as shown in FIGS. 21(a) and 21(b), first, the ECU 40 (proximity position changing section 386) changes the proximity position A between the host-vehicle 2 and the oncoming vehicle 4 to a changed proximity position B to come closer to the host-vehicle 2 outside of the waiting time generation area C. Although not specifically shown, it is also possible to set the proximity position B at the position of one end Lt of the waiting time generation area C.

Then, the ECU 40 (travelling plan generation section 387) generates a fifth travelling plan such as the following. Accordingly, while the oncoming vehicle 4 is accelerating, the holt-vehicle 2, the first and second following vehicles 7, 8 slow down to the changed proximity position (FIG. 21(a)). Then, after having passed through the waiting time generation area C, the oncoming vehicle 4 passes the host-vehicle 2 (FIG. 21(b)), and subsequently the first following vehicle 7 and the second following vehicle 8. Thereafter, the host-vehicle 2, the first following vehicle 7 and the second following vehicle 8 enter the waiting time generation area in order.

Then, the ECU 40 causes the travel driving unit 36 to execute the fifth travelling plan, and, at the same time, transmits the firth travelling plan via the communication unit 39 to the communication unit 51 of the oncoming vehicle 4, the communication unit 52 of the first following vehicle 7, and the communication unit of the second following vehicle 8, respectively.

Thereafter, the oncoming vehicle 4 receives the fifth travelling plan for execution thereof. Further, the first following vehicle 7 receives the fifth travelling plan at the communication unit 52 to execute the travelling plan. Furthermore, the second following vehicle 8 receives the fifth travelling plan by the communication unit associated with the following vehicle 8 for execution thereof.

Note that when it is determined in step S115 that the proximity position A is in the same position as the position threshold D, control proceeds to step S116 where the fifth plan will be executed.

On the other hand, in step S115, when it is determined that the distance La between the proximity position A and the host-vehicle 2 is longer than the distance Lb between the position threshold D and the host-vehicle (Lb and <La) and the proximity position A is farther from the host-vehicle 2 than the position threshold, control proceeds to step S117.

In step S117, as shown in FIG. 22 and FIG. 23, first, the ECU 40 (proximity position changing section 386) changes the proximity position A between the host-vehicle and the oncoming vehicle A to a changed proximity position B to come closer to the oncoming vehicle 4 outside of the waiting time generation area C.

Then, based on the information about the total number of the following vehicles which is outputted from the following vehicle confirming section 385, the ECU 40 (proximity position changing section 386) sets the changed proximity position B2. Compared to the changed proximity position B described above, the changed proximity position B2 will be set closer to the oncoming vehicle 4 as the total number of the following vehicles increases.

By way of a specific example of the method of calculating the changed proximity position B2, the following equation (9) may be mentioned:

$$Lc = La + (La' - La) \times N \quad (9)$$

The "Lc" in the Equation (9) represents the distance between the changed proximity position B2 and the host-vehicle 2, the "N" denotes an integer of 2 or larger representing the number of the following vehicles. In the present exemplary embodiment, the number of the following vehicles is two which are the first and second following vehicles 7,8. The distance Lc between the changed proximity position B2 and the host-vehicle 2 is expressed by the formula; $La + (La' - La) \times 2$.

In the Equation (9), the (La'−La) represents the distance between the changed proximity position B and the proximity position A in the case of absence of following vehicle. Thus, towards the changed proximity position B2 which has been changed in a position closer to the oncoming vehicle 4 by a distance corresponding to the number of following vehicles, the host-vehicle 2, the first and second following vehicles 7, 8 are accelerated while the oncoming vehicle 4 is decelerated.

Note that the setting method of the changed proximity position B is not particularly limited to that described above. For example, detecting the distance to the following vehicle 8 by a distance measuring sensor installed in the rear of the host-vehicle 2, the distance related information will be output to a travelling plan generation section 387. Then, by way of example, the travelling plan generating section 387 generates the travelling plan by setting a position closer to the oncoming vehicle 4 by the same distance as that measured distance as the changed proximity position B.

Then, the ECU 40 (travelling plan generating section 387) is to generate a sixth travelling plan such as the following. That is, upon the driving control being started (FIG. 22(a)), the vehicle 2 is accelerating to the changed proximity position B2, while the oncoming vehicle 4 slows down (FIG. 23(a)). After the host-vehicle 2 has passed the waiting time generation area C after elapse of time T1 of the driving control start, the host-vehicle 2 and the oncoming vehicle pass each other at the changed proximity position B2 (FIG. 22(b) and FIG. 23(b)). In the meantime, the first following vehicle 7 and the second following vehicle 8 are accelerated to follow the host-vehicle 2 and pass through the waiting time generation area C one after another. Thus, upon elapse of time T2 of the driving control start, at the position on the side of the oncoming vehicle 4 outside of the waiting time generation area C, the first following vehicle 7 passes the oncoming vehicle 4 (FIG. 22(c) and FIG. 23(b)). Further, upon elapse of time T3 of the driving control start, at the position on the side of the oncoming vehicle 4 outside of the waiting time generation area C, the second following vehicle 8 passes the oncoming vehicle 4 (FIG. 22(d) and FIG. 23(d)). Subsequently, the oncoming vehicle will pass through the waiting time generation area C.

Then, the ECU 40 causes the travel driving unit 36 to execute the sixth travelling plan, and at the same time transmits the sixth travelling plan via the communication unit 39 to the communication unit of the oncoming vehicle 4, the communication unit 52 of the first following vehicle 7, and the communication unit of the second following vehicle 8, respectively.

Thereafter, the oncoming vehicle 4 receives the sixth travelling plan at the communication unit 51 to thereby run the sixth travelling plan. Further, the first following vehicle 7 also receives the sixth travelling plan at the communication unit 52 to execute the sixth travelling plan. Further, the second following vehicle 8 likewise receives the sixth travelling plan at the communication unit of the second following vehicle 8 to execute the sixth travelling plan.

Suppose, if the changed proximity position B only were changed without setting the changed proximity position B2, as shown by a dashed line in FIG. 22(thin line), after the host-vehicle 2 and the oncoming vehicle 4 have passed each other in the changed proximity position B, the oncoming vehicle 4 has to stop for waiting until the first following vehicle 7 and the second following vehicle 8 pass through the waiting time generation area C, which is stressful for the driver.

On the other hand, if the changed proximity position B is set, as shown by a dashed line 22 (thick line) in FIG. 22, the oncoming vehicle can pass the first and second following vehicles outside the waiting time generation area without stopping. This situation would less likely to stress the driver.

Also, in the present exemplary embodiment, as in the first exemplary embodiment, since the proximity position is located in the waiting time generation area, when the host-vehicle 2 and the oncoming vehicle 4 travel on the same lane at the same time, by changing the proximity position outside of the waiting time generation area so that, while both running vehicles are caused to approach each other, such a driving control will be carried out according to which, after one of the host-vehicle and the other vehicle has passed through the waiting time generation area, the other one of the host-vehicle and the other vehicle will be caused to enter the waiting time generation area.

Therefore, in the present exemplary embodiment, in the waiting time generation area, it is possible to reduce the waiting time of the vehicle.

Further, in the present exemplary embodiment, as in the first exemplary embodiment, the position threshold is set, and based on a determination result of whether or not the proximity position is close to the host-vehicle compared to the position threshold, the proximity position will be changed to a changed proximity position closer either to the host-vehicle or the other vehicle. Thus, the vehicle closer to the waiting time generation area may be caused to pass through earlier. Also in the present exemplary embodiment, it is possible to perform a driving control by the travelling plan without significantly changing the running state of the host-vehicle and the other vehicle, thus imparting less stress on the driver.

Further, in the present exemplary embodiment, as in the first exemplary embodiment, the position threshold is set at the center of the waiting time generation area, accurate determination may be made which of the host-vehicle and the other vehicle is closer to the waiting time generation area.

Further, in the present exemplary embodiment, as in the first exemplary embodiment, among the host-vehicle, the following vehicle, and the other vehicle, the one vehicle close to the waiting time or latency generation area is caused to accelerate while the other vehicle far from the waiting time generation area is caused to decelerate. Thus, in the present exemplary embodiment, in the waiting time generation area, it will be possible for both vehicles to pass through smoothly. That is, in the present exemplary embodiment, it is possible to smooth the traffic flow.

Further, in the present exemplary embodiment, a travelling plan is generated in accordance with the presence of following vehicles. Thus, in the waiting time generation area, it is possible to reduce the waiting time associated with each of the host-vehicle, oncoming vehicle, and following vehicle. Therefore, it is possible to smoother traffic flow.

As in the first embodiment, also in the present exemplary embodiment, depending on whether or not the proximity position is located in the waiting time generation area, it is determined to execute the driving control or not. Thus, the driving control will be performed only when necessary. Therefore, the travel control will be prevented from being performed when no waiting time or latency would occur.

Further, according to the fourth travelling plan in the present exemplary embodiment, the host-vehicle, the oncoming vehicle, and the following vehicle pass through the waiting time generation area alternately. Thus, compared to a situation in which the host-vehicle and the following vehicle pass the waiting time generation area together, it is possible to suppress the amount of deceleration of the oncoming vehicle to thereby perform a smoother traffic flow.

Further, according to the sixth travelling plan in the present embodiment, the changed proximity position is set according to the number of the following vehicles. Therefore, without the oncoming vehicle being stopped, it is possible that the host-vehicle and a plurality of the following vehicles pass through the waiting time generating area as one group.

The GPS receiver 3 and the position/speed detecting section 381 in the third exemplary embodiment correspond to an example of a host-vehicle position detecting means according to the present invention. The wheel speed sensor 34 and the position/speed detecting section 381 in the third exemplary embodiment corresponds to the host-vehicle speed detecting means according to the present invention. The communication unit 39 in the third embodiment corresponds to one example of the acquisition unit and the transmission unit according to the present invention. The proximity position estimation section 382 in the third embodiment corresponds to one example of the proximity position estimation means according to the present invention. The proximity position changing section 386 in the third embodiment corresponds to an example of the proximity position changing means according to the present invention. The travelling plan generating section 387 in the third embodiment corresponds to the travelling plan generating means according to the present invention. The travel driving unit 36 in the third embodiment corresponds to an example of the travel driving means according to the present invention. The following vehicle confirming section 385 and the communication unit 39 in the third embodiment correspond to the following vehicle confirming means in the present invention. Finally, the waiting time generation area C in the third embodiment corresponds to an example of a predetermined area according to the present invention.

Also, it should be noted that the exemplary embodiments described above are intended to facilitate understanding of the present invention, and not described to limit the present invention. Therefore, the elements disclosed in the above embodiments are deemed to include all design modifications and equivalents belonging to the technical scope of the present invention.

The invention claimed is:

1. A driving control system comprising:
a host-vehicle position detecting means configured to detect a position of a host-vehicle;
a host-vehicle speed detecting means configured to detect a speed of the host-vehicle;
an acquisition means configured to acquire position information and speed information about another vehicle travelling towards the host-vehicle;
a proximity position estimation means configured to estimate a proximity position at which the host-vehicle and the other vehicle approach each other based on the position and the speed of the host-vehicle and the position and the speed of the other vehicle;
a proximity position changing means configured to change a proximity position to a first changed proximity position outside of a predetermined area, when the estimated proximity position is located in the predetermined area and the host-vehicle and the other vehicle travel on a same lane at a same time;

a travelling plan generating means configured to generate a travelling plan that when the proximity position changing means has changed to the first changed proximity position, while both the host-vehicle and the other vehicle approach the first changed proximity position, after one of the host-vehicle and the other vehicle has passed through the predetermined area, and the other one of the host-vehicle and the other vehicle enters the predetermined area;

a transmission means configured to transmit the travelling plan to the other vehicle; and a travel driving means configured to execute driving of the host-vehicle according to the travelling plan, wherein the proximity position changing means is further configured to:

set a predetermined position threshold between the host-vehicle and the other vehicle in the predetermined area;

change the proximity position to the first changed proximity position when determined that the estimated proximity position is closer to the host-vehicle compared to the position threshold so as for the proximity position to come closer to the host-vehicle outside of the predetermined area; and change the proximity position to the first changed proximity position when determined that the estimated proximity position is closer to the other vehicle compared to the position threshold so as for the proximity position to come closer to the other vehicle outside of the predetermined area; and wherein the travelling plan generating means is further configured to:

generate the travelling plan that, when the proximity position has been changed to the first changed proximity position closer to the host-vehicle by the proximity position changing means, the host-vehicle is caused to decelerate and the other vehicle is caused to accelerate; and generate the travelling plan that, when the proximity position has been changed to the first changed proximity position closer to the other vehicle by the proximity position changing means, the host-vehicle is caused to accelerate and the other vehicle is caused to decelerate.

2. The driving control system as claimed in claim 1, wherein the proximity position changing means is further configured to set the position threshold substantially at a center of the predetermined area.

3. A driving control system comprising:
a host-vehicle position detecting means configured to detect a position of a host-vehicle;
a host-vehicle speed detecting means configured to detect a speed of the host-vehicle;
an acquisition means configured to acquire position information and speed information about another vehicle travelling towards the host-vehicle;
a proximity position estimation means configured to estimate a proximity position at which the host-vehicle and the other vehicle approach each other based on the position and the speed of the host-vehicle and the position and the speed of the other vehicle;
a proximity position changing means configured to change a proximity position to a first changed proximity position outside of a predetermined area, when the estimated proximity position is located in the predetermined area and the host-vehicle and the other vehicle travel on a same lane at a same time;

a travelling plan generating means configured to generate a travelling plan when the proximity position changing means has changed to the first changed proximity position, while both the host-vehicle and the other vehicle approach the first changed proximity position, after one of the host-vehicle and the other vehicle has passed through the predetermined area, and the other one of the host-vehicle and the other vehicle enters the predetermined area;

a transmission means configured to transmit the travelling plan to the other vehicle; and a following vehicle confirming means configured to confirm a presence of a following vehicle traveling rearward of the host-vehicle, wherein the proximity position changing means is further configured to:

set a predetermined position threshold between the host-vehicle and the other vehicle in the predetermined area;

change the proximity position to a first changed proximity position when determined that the estimated proximity position is closer to the host-vehicle compared to the position threshold so as for the proximity position to come closer to the host-vehicle outside of the predetermined area; and change the proximity position to the first changed position when determined that the estimated proximity position is closer to the other vehicle compared to the position threshold so as for the proximity position to come closer to the other vehicle outside of the predetermined area, wherein the following vehicle confirming means is configured to detect more than one following vehicle and the presence and a number of following vehicles; and when the following vehicle confirming means detects one following vehicle and the proximity position changing means changes the proximity position to the first changed proximity position close to the other vehicle, the travelling plan generating means is configured to generate the travelling plan according to which, while the host-vehicle, the other vehicle, and following vehicle are all approaching the first changed proximity position, the host-vehicle is caused to accelerate whereas the other vehicle and the following vehicle are caused to decelerate so that, after the host-vehicle has passed through the predetermined area, and the other vehicle is caused to accelerate to pass through the predetermined area while maintaining the following vehicle decelerating, the following vehicle is then caused to enter the predetermined area.

4. A driving control system comprising:
a host-vehicle position detecting means configured to detect a position of a host-vehicle;
a host-vehicle speed detecting means configured to detect a speed of the host-vehicle;
an acquisition means configured to acquire position information and speed information about another vehicle travelling towards the host-vehicle;
a proximity position estimation means configured to estimate a proximity position at which the host-vehicle and the other vehicle approach each other based on the position and the speed of the host-vehicle and the position and the speed of the other vehicle;
a proximity position changing means configured to change a proximity position to a first changed proximity position outside of a predetermined area, when the estimated proximity position is located in the predetermined area and the host-vehicle and the other vehicle travel on a same lane at a same time;

a travelling plan generating means configured to generate a travelling plan when the proximity position changing means has changed to the first changed proximity position, while both the host-vehicle and the other vehicle approach the first changed proximity position, after one of the host-vehicle and the other vehicle has passed through the predetermined area, and the other one of the host-vehicle and the other vehicle enters the predetermined area;

a transmission means configured to transmit the travelling plan to the other vehicle; and a following vehicle confirming means configured to confirm a presence of a following vehicle traveling rearward of the host-vehicle, wherein the proximity position changing means is further configured to:

set a predetermined position threshold between the host-vehicle and the other vehicle in the predetermined area;

change the proximity position to a first changed proximity position when determined that the estimated proximity position is closer to the host-vehicle compared to the position threshold so as for the proximity position to come closer to the host-vehicle outside of the predetermined area; and change the proximity position to the first changed position when determined that the estimated proximity position is closer to the other vehicle compared to the position threshold so as for the proximity position to come closer to the other vehicle outside of the predetermined area, wherein the following vehicle confirming means is configured to detect more than one following vehicle and the presence and a number of following vehicles;

when the following vehicle confirming means detects two or more following vehicles and the proximity position changing means changes the proximity position to the first changed proximity position close to the other vehicle, the travelling plan generating means is configured to change the first changed proximity position to a second changed proximity position which will be closer to the other vehicle as the number of the following vehicles increases; and the travelling plan generating means further generates a travelling plan according to which, while the host-vehicle, the other vehicle, and the following vehicles are all approaching the second changed proximity position, the host-vehicle and the following vehicles are caused to accelerate whereas the other vehicle is caused to decelerate so that, after the host-vehicle and the following vehicles have passed through the predetermined area, the other vehicle is caused to enter the predetermined area.

5. A driving control system comprising:

a host-vehicle position detecting means configured to detect a position of a host-vehicle;

a host-vehicle speed detecting means configured to detect a speed of the host-vehicle;

an acquisition means configured to acquire position information and speed information about another vehicle travelling towards the host-vehicle;

a proximity position estimation means configured to estimate a proximity position at which the host-vehicle and the other vehicle approach each other based on the position and the speed of the host-vehicle and the position and the speed of the other vehicle;

a proximity position changing means configured to change a proximity position to a first changed proximity position outside of a predetermined area, when the estimated proximity position is located in the predetermined area and the host-vehicle and the other vehicle travel on a same lane at a same time;

a travelling plan generating means configured to generate a travelling plan when the proximity position changing means has changed to the first changed proximity position, while both the host-vehicle and the other vehicle approach the first changed proximity position, after one of the host-vehicle and the other vehicle has passed through the predetermined area, and the other one of the host-vehicle and the other vehicle enters the predetermined area;

a transmission means configured to transmit the travelling plan to the other vehicle; and a following vehicle confirming means configured to confirm a presence of a following vehicle traveling rearward of the host-vehicle, wherein the proximity position changing means is further configured to:

set a predetermined position threshold between the host-vehicle and the other vehicle in the predetermined area;

change the proximity position to a first changed proximity position when determined that the estimated proximity position is closer to the host-vehicle compared to the position threshold so as for the proximity position to come closer to the host-vehicle outside of the predetermined area; and change the proximity position to the first changed position when determined that the estimated proximity position is closer to the other vehicle compared to the position threshold so as for the proximity position to come closer to the other vehicle outside of the predetermined area, wherein the following vehicle confirming means is configured to detect more than one following vehicle and the presence and a number of following vehicles; and when the following vehicle confirming means detects one or more following vehicles and the proximity position changing means changes the proximity position to the first changed proximity position close to the host-vehicle, the travelling plan generating means further generates a travelling plan according to which, while the host-vehicle, the other vehicle, and the following vehicle are all approaching the first changed proximity position, the host-vehicle and the following vehicle are caused to decelerate whereas the other vehicle is caused to accelerate so that, after the other vehicle has passed through the predetermined area, the host-vehicle and the following vehicle are caused to enter the predetermined area.

* * * * *